(12) United States Patent
Watanabe

(10) Patent No.: US 10,362,230 B2
(45) Date of Patent: Jul. 23, 2019

(54) IN-VEHICLE DISPLAY DEVICE

(71) Applicant: TOYOTA JIDOSHA KABUSHIKI KAISHA, Toyota-shi, Aichi-ken (JP)

(72) Inventor: Masaya Watanabe, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 999 days.

(21) Appl. No.: 14/839,267

(22) Filed: Aug. 28, 2015

(65) Prior Publication Data

US 2016/0073031 A1    Mar. 10, 2016

(30) Foreign Application Priority Data

Sep. 5, 2014    (JP) .................................. 2014-181433

(51) Int. Cl.
*G02B 27/01* (2006.01)
*G02F 1/01* (2006.01)
(Continued)

(52) U.S. Cl.
CPC ......... *H04N 5/23293* (2013.01); *B60K 35/00* (2013.01); *B60K 37/02* (2013.01); *B60R 1/00* (2013.01); *G02B 27/0101* (2013.01); *G02B 27/0149* (2013.01); *G02F 1/0121* (2013.01); *G06T 3/40* (2013.01); *B60K 2350/106* (2013.01); *B60K 2350/1072* (2013.01); *B60K 2350/1088* (2013.01); *B60K 2350/1096* (2013.01); *B60K 2350/2013* (2013.01); *B60K 2350/2052* (2013.01); *B60K 2350/2056* (2013.01); *B60K 2350/352* (2013.01); *B60K 2350/405* (2013.01); *B60K 2350/962* (2013.01); *B60K 2350/965* (2013.01); *B60R 2300/205* (2013.01); *B60R 2300/301* (2013.01); *B60R 2300/308* (2013.01); *B60R 2300/802* (2013.01); *B60W 2050/146* (2013.01);
(Continued)

(58) Field of Classification Search
None
See application file for complete search history.

(56) References Cited

U.S. PATENT DOCUMENTS

| 2009/0225434 | A1* | 9/2009 | Nicholas | B60R 1/00 |
|---|---|---|---|---|
| | | | | 359/630 |
| 2013/0194426 | A1* | 8/2013 | Schofield | B60R 1/00 |
| | | | | 348/148 |
| 2015/0116837 | A1* | 4/2015 | Yamada | B60K 35/00 |
| | | | | 359/632 |

FOREIGN PATENT DOCUMENTS

| DE | 102012019508 A1 | 4/2014 |
|---|---|---|
| JP | H06-936 U | 1/1994 |

(Continued)

*Primary Examiner* — Benjamin C Lee
*Assistant Examiner* — Krishna P Neupane
(74) *Attorney, Agent, or Firm* — Oliff PLC

(57) ABSTRACT

One embodiment of an in-vehicle display device includes: a display unit that includes a transparent display part and a low-transmissivity display part, and that changes an area ratio of an area of the low-transmissivity display part to an area of the transparent display part; an image capturing unit that captures a space around the vehicle as an image; and a first display control unit configured to control the display unit such that the area ratio is increased when a predetermined condition is satisfied as compared to when the predetermined condition is not satisfied, and the image captured by the image capturing unit is displayed in the low-transmissivity display part after the area ratio has been increased.

20 Claims, 16 Drawing Sheets

(51) Int. Cl.
  *H04N 5/232*      (2006.01)
  *G06T 3/40*        (2006.01)
  *B60K 35/00*      (2006.01)
  *B60K 37/02*      (2006.01)
  *B60R 1/00*        (2006.01)
  *B60W 50/14*      (2012.01)
(52) U.S. Cl.
  CPC   *G02B 2027/014* (2013.01); *G02B 2027/0118* (2013.01); *G02B 2027/0138* (2013.01); *G02B 2027/0141* (2013.01); *G02B 2027/0154* (2013.01); *G02B 2027/0159* (2013.01)

(56)         References Cited

FOREIGN PATENT DOCUMENTS

| JP | 2000-203309 A |   | 7/2000  |           |
|----|---------------|---|---------|-----------|
| JP | 2001-301486 A |   | 10/2001 |           |
| JP | 2006-065091 A |   | 3/2006  |           |
| JP | 2008-209724 A |   | 9/2008  |           |
| JP | 2008209724 A  | * | 9/2008  | G02B 27/01 |
| JP | 2011-016385 A |   | 1/2011  |           |
| JP | 2011-079345 A |   | 4/2011  |           |
| JP | 2013-217744 A |   | 10/2013 |           |
| JP | 2013-244787 A |   | 12/2013 |           |

\* cited by examiner

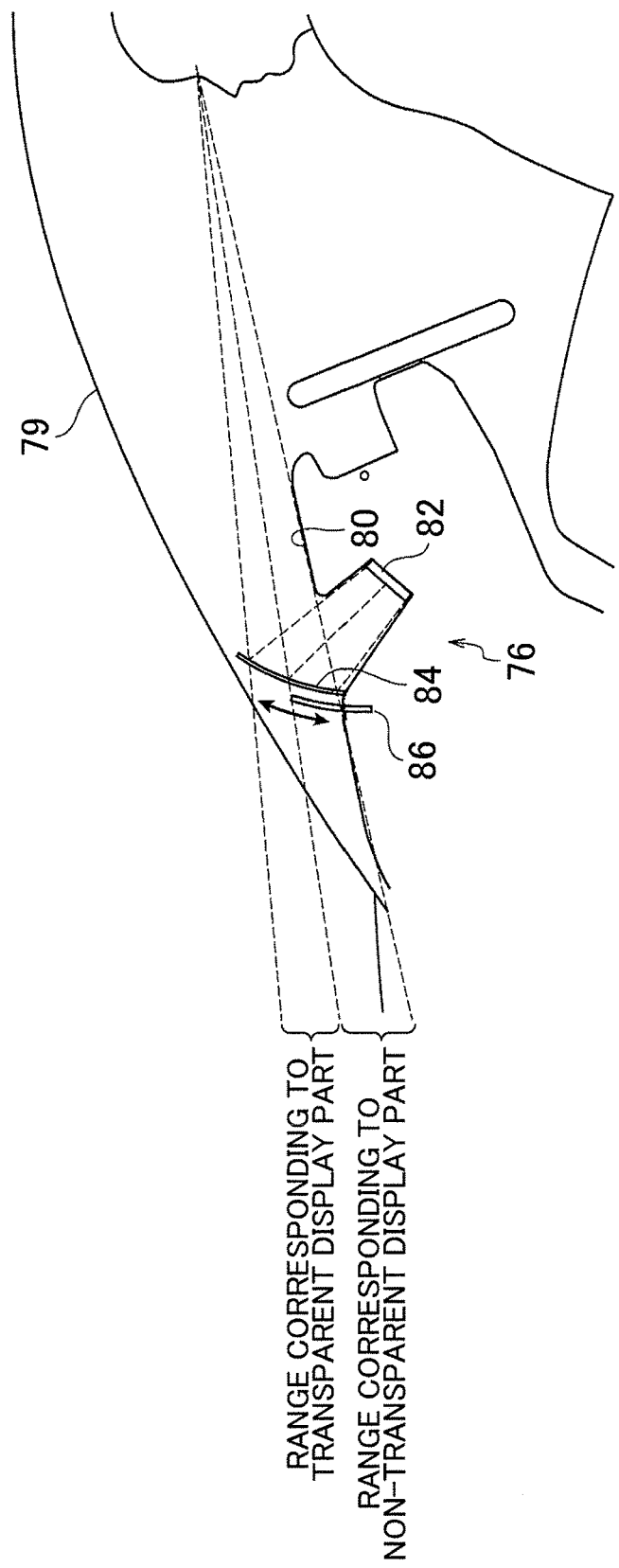

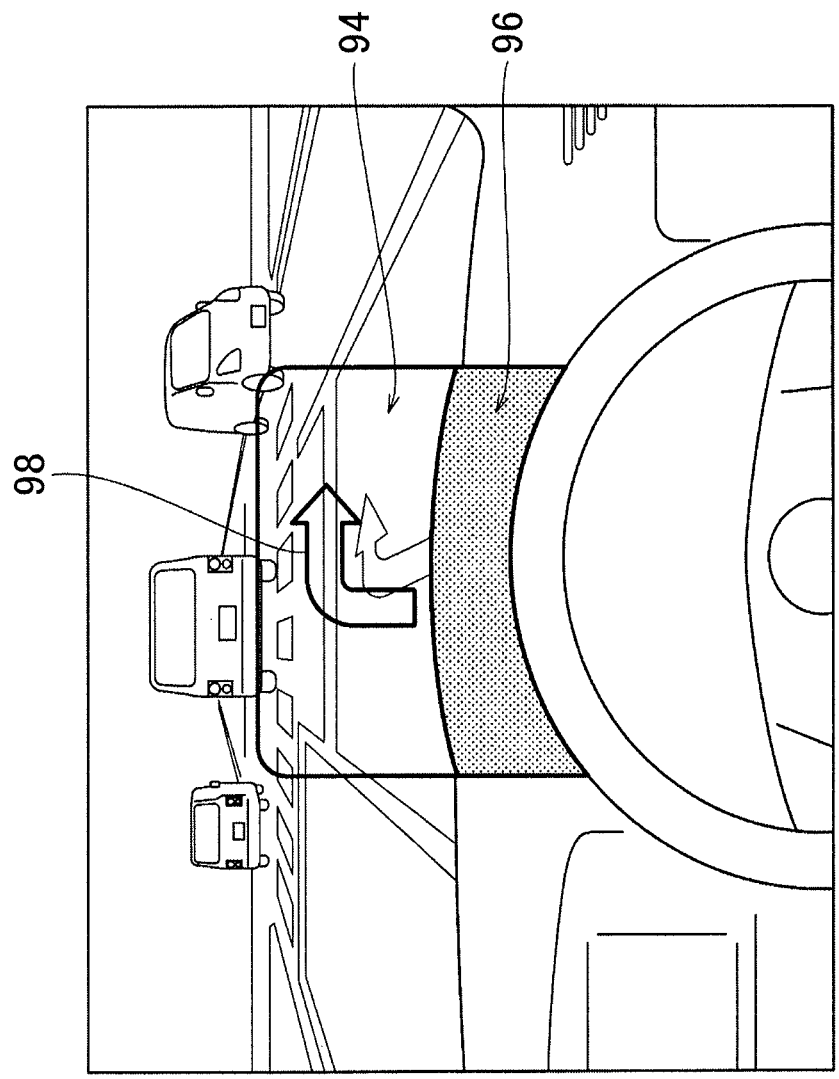

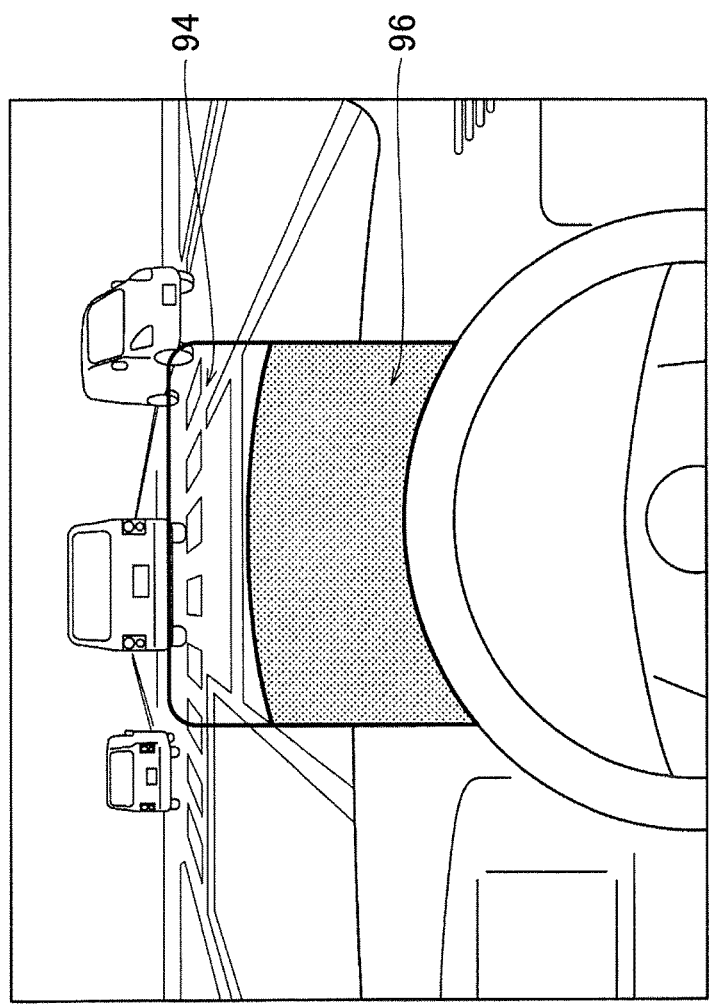

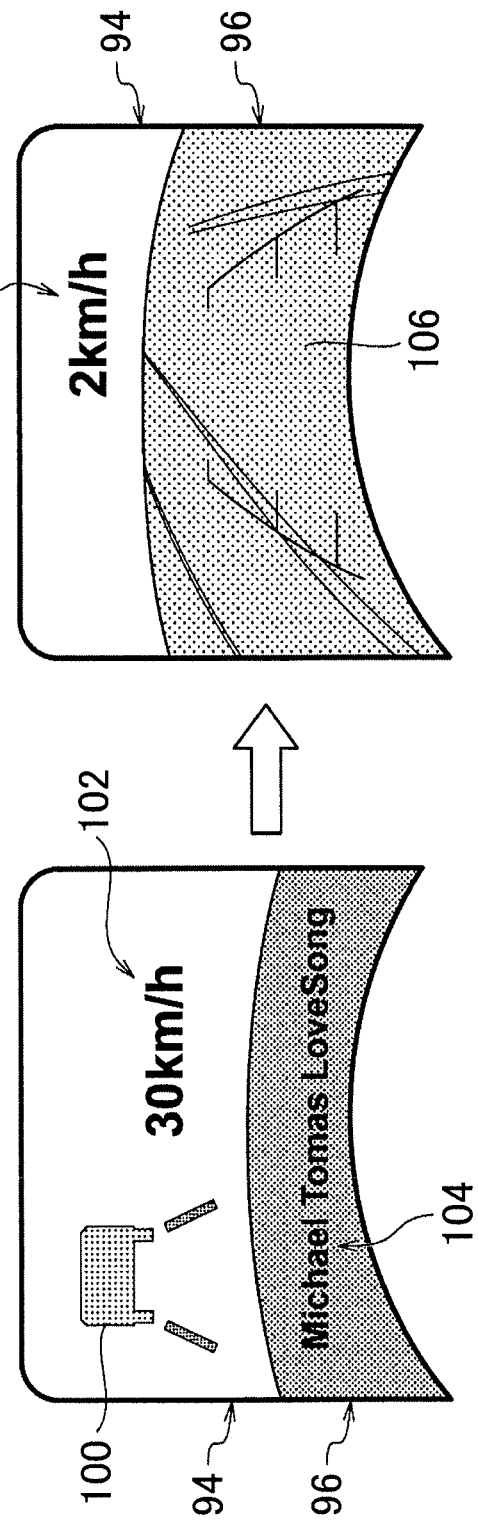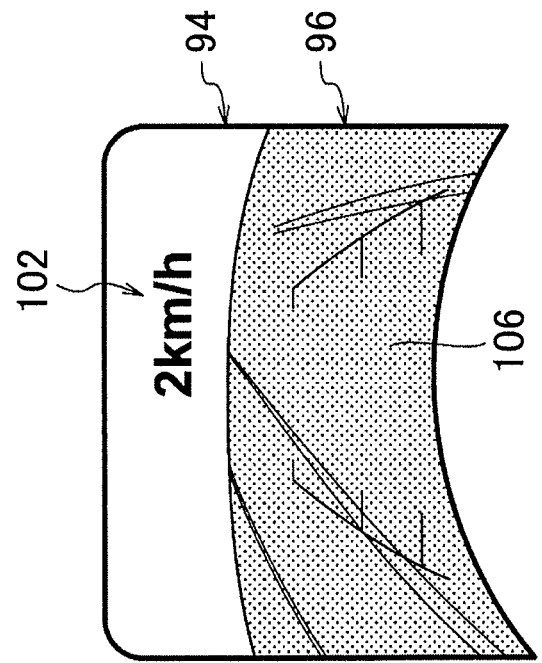

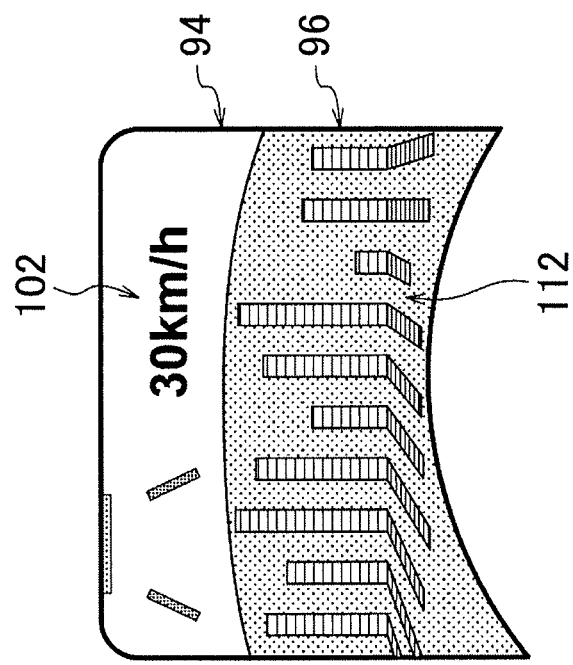
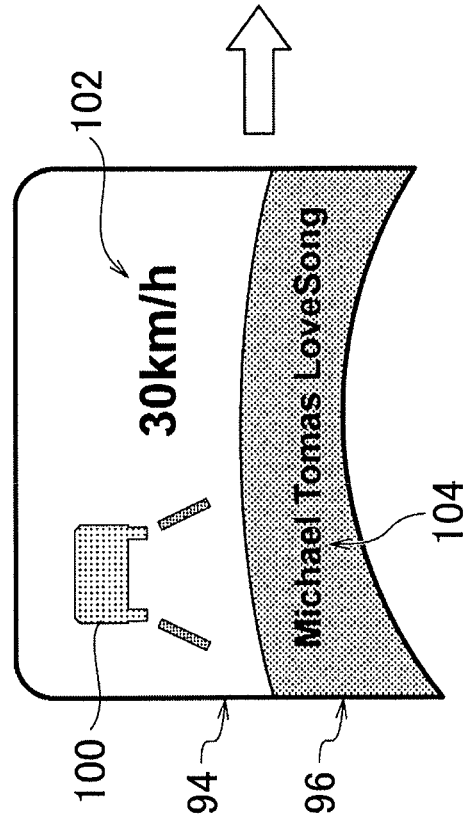

IN-VEHICLE DISPLAY DEVICE

INCORPORATION BY REFERENCE

The disclosure of Japanese Patent Application No. 2014-181433 filed on Sep. 5, 2014 including the specification, drawings and abstract is incorporated herein by reference in its entirety.

BACKGROUND OF THE INVENTION

1. Field of the Invention

The present invention relates to an in-vehicle display device.

2. Description of Related Art

Japanese Patent Application Publication No. 2008-209724 (JP 2008-209724 A) describes an in-vehicle head-up display that reflects a display image on a display unit onto the front windshield to allow a driver to view the virtual image of the reflected display image. In the head-up display, a reflection screen that can be switched between the transparent state and the non-transparent state is provided on the front windshield and a display image (for example, an image of vehicle information such as the vehicle speed or the route guidance) is reflected on the reflection screen in the non-transparent state to show the driver the virtual image of the reflected display image. According to the head-up display, based on the fact that the driver's effective visual field is narrowed as the vehicle speed increases, the transparent state and the non-transparent state are switched for each part on the reflection screen according to the vehicle speed such that the virtual image is displayed in the upper position of the vehicle as the vehicle speed increases.

The spatial distribution of the real-space scene ahead of the vehicle is not constant in brightness and color tone and, in addition, the spatial distribution of brightness and color tone varies as the time elapses. Therefore, when an image is superimposed on the real-space scene ahead of the vehicle by means of the in-vehicle head-up display, the visibility varies because it is affected by the brightness and the color tone of the real-space scene ahead of the vehicle. The visibility of some of the images displayed on the in-vehicle head-up display is easily decreased by the effect of the brightness and the color tone of the real-space scene ahead of the vehicle. Therefore, there is a possibility that superimposing these types of images on the real-space scene ahead of the vehicle significantly decreases the visibility, makes it difficult to transmit information to the driver smoothly, and hinders the driver's visibility of the real-space scene ahead of the vehicle.

SUMMARY OF THE INVENTION

The present invention provides an in-vehicle display device that can display information, not suitable for being superimposed on the real-space scene ahead of a vehicle, while ensuring visibility and safety.

A first aspect of the invention relates to an in-vehicle display device including: a display unit that includes a transparent display part and a low-transmissivity display part, and that changes an area ratio of an area of the low-transmissivity display part to an area of the transparent display part, the transparent display part being a part through which a light from a real space ahead of a vehicle transmits and in which an image is superimposed on a scene in the real space, the low-transmissivity display part being a part a light transmissivity of which for a light from the real space is lower than a light transmissivity of the transparent display part and in which an image is displayed; an image capturing unit that captures a space around the vehicle as an image; and a first display control unit configured to control the display unit such that the area ratio is increased when a predetermined condition is satisfied as compared to when the predetermined condition is not satisfied, and the image captured by the image capturing unit is displayed in the low-transmissivity display part after the area ratio has been increased.

An image obtained by capturing the space around the vehicle is very useful information for the driver. However, the image described above is an image that represents the situation of the space in back of the vehicle based on the spatial distribution of the brightness and the color tone of each pixel as well as their changes over time. Therefore, when this image is superimposed on the scene in the real space ahead of the vehicle, the visibility is easily decreased by the effect of the brightness and the color tone of the scene in the real space ahead of the vehicle, meaning that this image is not suitable for being superimposed on the scene in the real space ahead of the vehicle.

According to the configuration described above, the display unit includes the transparent display part, which is an part through which a light from the real space ahead of a vehicle transmits and in which an image can be superimposed on a scene in the real space, and the low-transmissivity display part, which is an part the light transmissivity of which for a light from the real space is lower than the light transmissivity of the transparent display part and in which an image can be displayed. In addition, the area ratio of the area the low-transmissivity display part to the area the transparent display part can be changed in the display unit. The display unit is controlled such that the area ratio is increased when the predetermined condition is satisfied as compared to when the predetermined condition is not satisfied, and the image of the space around the vehicle is displayed in the low-transmissivity display part after the area ratio has been increased. This allows the information (the image of the space around the vehicle), which is not suitable for being superimposed on the scene in the real space ahead of the vehicle, to be displayed while ensuring visibility and safety.

The image capturing unit may include a first image capturing unit that captures a space in back of the vehicle as an image. In this case, the first display control unit may be configured to control the display unit such that the area ratio is increased when a shift position of the vehicle is a reverse position as compared to when the shift position is not the reverse position, and the image captured by the first image capturing unit is displayed in the low-transmissivity display part after the area ratio has been increased.

An image obtained by capturing the space in back of the vehicle is very useful information for the driver when driving the vehicle in the reverse direction. However, the image described above is an image that represents the situation of the space in back of the vehicle based on the spatial distribution of the brightness and the color tone of each pixel as well as their changes over time. Therefore, when this image is superimposed on the scene in the real space ahead of the vehicle, the visibility is easily decreased by the effect of the brightness and the color tone of the scene in the real space ahead of the vehicle, meaning that this image is not suitable for being superimposed on the scene in the real space ahead of the vehicle. On the other hand, when the shift position of the vehicle is the reverse position, the driver is required to know the situation in back of the vehicle.

According to the configuration described above, the display unit includes the transparent display part, which is an part through which a light from the real space ahead of a vehicle transmits and in which an image can be superimposed on a scene in the real space, and the low-transmissivity display part, which is an part the light transmissivity of which for a light from the real space is lower than the light transmissivity of the transparent display part and in which an image can be displayed. In addition, the area ratio of the area the low-transmissivity display part to the area the transparent display part can be changed in the display unit. The display unit is controlled such that the area ratio is increased when the shift position of the vehicle is the reverse position as compared to when the shift position is not the reverse position, and the image of the space in back of the vehicle is displayed in the low-transmissivity display part after the area ratio has been increased. This allows the information (the image of the space in back of the vehicle), which is not suitable for being superimposed on the scene in the real space ahead of the vehicle, to be displayed while ensuring visibility and safety.

The in-vehicle display device may further include an object detection unit that detects an object in a blind spot of a driver, on a side of the vehicle, and the image capturing unit may include a second image capturing unit that captures a space on the side of the vehicle, which includes the blind spot, as an image. In this case, the first display control unit may be configured to control the display unit such that the area ratio is increased when an object in the blind spot is detected by the object detection unit as compared to when an object in the blind spot is not detected, and the image captured by the second image capturing unit is displayed in the low-transmissivity display part after the area ratio has been increased.

An image, obtained by capturing a space on a side of the vehicle, which includes a blind spot of the driver, is very useful information for the driver especially when there is an object in the blind spot. However, the image described above is also an image that represents the situation of the space on side of the vehicle based on the spatial distribution of the brightness and the color tone of each pixel as well as their changes over time. Therefore, when this image is superimposed on the scene in the real space ahead of the vehicle, the visibility is easily decreased by the effect of the brightness and the color tone of the scene in the real space ahead of the vehicle, meaning that this image is not suitable for being superimposed on the scene in the real space ahead of the vehicle. On the other hand, when there is an object in a blind spot of the driver, the driver is required to recognize the object in the blond spot and to pay attention to the object.

According to the configuration described above, the display unit includes the transparent display part, which is an part through which a light from the real space ahead of a vehicle transmits and in which an image can be superimposed on a scene in the real space, and the low-transmissivity display part, which is an part the light transmissivity of which for a light from the real space is lower than the light transmissivity of the transparent display part and in which an image can be displayed. In addition, the area ratio of the area of the low-transmissivity display part to the area of the transparent display part and can be changed in the display unit. The display unit is controlled such that the area ratio is increased when an object in the blind spot of the driver is detected by the object detection unit as compared when an object in the blind spot is not detected, and the image of a space on side of the vehicle, which includes the blind spot of the driver, is displayed in the low-transmissivity display part after the area ratio has been increased. This allows the information (the image of a space on side of the vehicle, which includes a blind spot of the driver), which is not suitable for being superimposed on the scene in the real space ahead of the vehicle, to be displayed while ensuring visibility and safety.

A second aspect of the invention relates to an in-vehicle display device including: a display unit that includes a transparent display part and a low-transmissivity display part, and that changes an area ratio of an area of the low-transmissivity display part to an area of the transparent display part, the transparent display part being a part through which a light from a real space ahead of a vehicle transmits and in which an image is superimposed on a scene in the real space, the low-transmissivity display part being a part a light transmissivity of which for a light from the real space is lower than a light transmissivity of the transparent display part and in which an image is displayed; a warning determination unit configured to determine whether a warning is to be issued to a driver; and a second display control unit configured to control the display unit such that the area ratio is increased when the warning determination unit determines that a warning is to be issued to the driver as compared to when the warning determination unit does not determine that a warning is to be issued to the driver, and information indicating the warning to be issued to the driver is displayed as an image in the low-transmissivity display part after the area ratio has been increased.

If, when a warning is to be issued to the driver, the information indicating the warning to be issued to the driver is superimposed on the scene of the real space ahead of the vehicle as an image and if the visibility of the image is decreased by the effect of the brightness and the color tone of the scene in the real space ahead of the vehicle, there is a possibility that the warning is not recognized by the driver or is wrongly recognized by the driver as a low-warning-level warning.

According to the configuration described above, the display unit includes the transparent display part, which is an part through which a light from the real space ahead of a vehicle transmits and in which an image can be superimposed on a scene in the real space, and the low-transmissivity display part, which is an part the light transmissivity of which for a light from the real space is lower than the light transmissivity of the transparent display part and in which an image can be displayed. In addition, the area ratio of the area the low-transmissivity display part to the area of the transparent display part can be changed in the display unit. The display unit is controlled such that the area ratio is increased when the warning determination unit determines that a warning is to be issued to a driver as compared to when the warning determination unit does not determine that a warning is to be issued to a driver, and information, which indicates the warning to be issued to the driver, is displayed as an image in the low-transmissivity display part after the area ratio has been increased. This allows the information (the image of the information indicating the warning to be issued to the driver), which is not suitable for being superimposed on the scene in the real space ahead of the vehicle, to be displayed while ensuring visibility and safety.

A third aspect of the invention relates to an in-vehicle display device including: a display unit that includes a transparent display part and a low-transmissivity display part, and that changes an area ratio of an area of the low-transmissivity display part to an area of the transparent display part, the transparent display part being a part through which a light from a real space ahead of a vehicle transmits and in which an image is superimposed on a scene in the real space, the low-transmissivity display part being a part a light transmissivity of which for a light from the real space is lower than a light transmissivity of the transparent display part and in which an image is displayed; a drive assist unit configured to perform drive assist processing that assists a driver in driving the vehicle; and a third display control unit configured to control the display unit such that the area ratio is increased when the drive assist unit performs the drive assist processing as compared to when the drive assist unit does not perform the drive assist processing, and information other than information indicating a state of the vehicle is displayed as an image in the low-transmissivity display part after the area ratio has been increased.

When the information other than the information indicating the state of the vehicle is superimposed on the scene in the real space ahead of the vehicle, there is a high possibility that the visibility is easily decreased by the effect of the brightness and the color tone of the scene in the real space ahead of the vehicle. On the other hand, while the drive assist processing that assists the driver in driving the vehicle is performed by the drive assist unit, it is assumed that the load on the driver is reduced and that the amount of information that indicates the state of the vehicle and is to be transmitted to the driver is reduced.

According to the configuration described above, the display unit includes the transparent display part, which is an part through which a light from the real space ahead of a vehicle transmits and in which an image can be superimposed on a scene in the real space, and the low-transmissivity display part, which is an part the light transmissivity of which for a light from the real space is lower than the light transmissivity of the transparent display part and in which an image can be displayed. In addition, the area ratio of the area of the low-transmissivity display part to the area of the transparent display part can be changed. The display unit is controlled such that the area ratio is increased when the drive assist processing that assists the driver in driving the vehicle is performed as compared to when the drive assist processing is not performed, and the information, which indicates the information other than the information indicating the state of the vehicle, is displayed as an image in the low-transmissivity display part after the area ratio has been increased. This allows the information (the image of the information other than the information indicating the state of the vehicle), which is not suitable for being superimposed on the scene in the real space ahead of the vehicle, to be displayed while ensuring visibility and safety.

The display unit may include a combiner, provided between a windshield glass and an instrument panel of the vehicle, and a low-transmissivity part increase/decrease unit that changes the area ratio. A display part of the combiner may be divided into the transparent display part and the low-transmissivity display part.

The low-transmissivity part increase/decrease unit may include a low-transparency member that shields or reduces a part of a lower side of a light flux, directed from the real space toward the driver through the combiner, and an actuator that moves the low-transparency member with respect to the combiner. In this case, the transparent display part may correspond to a part of the light flux not shielded or reduced by the low-transparency member, and the low-transmissivity display part may correspond to the part of the light flux shielded or reduced by the low-transparency member, and the area ratio may be changed when the low-transparency member is moved with respect to the combiner.

The actuator may move the low-transparency member with respect to the combiner along an up-down direction of the combiner, and the area ratio may be changed when the low-transparency member is moved along the up-down direction.

The actuator may rotate the low-transparency member with respect to the combiner about an axis along a transverse direction of the vehicle or an axis along a longitudinal direction of the vehicle, and the area ratio may be changed when the low-transparency member is rotated.

The low-transmissivity part increase/decrease unit may include a plurality of transmissivity changing parts provided along an up-down direction of the combiner, and a driving circuit. A light transmissivity of each of the plurality of transmissivity changing parts may be changed by turning on or off an application of voltage, and the driving circuit may control turning on or off the application of voltage to the plurality of transmissivity changing parts. The area ratio may be changed when the number of the transmissivity changing parts the light transmissivity of which is decreased is changed by the driving circuit.

According to the configurations described above, the information, not suitable for being superimposed on the real-space scene ahead of a vehicle, can be displayed while ensuring visibility and safety.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a general configuration diagram showing a head-up display (HUD);

FIG. 5 is an image diagram showing the driver's visual field when a non-transparent plate is positioned in a lower position;

FIG. 6 is an image diagram showing the driver's visual field when a non-transparent plate is positioned in an upper position;

FIGS. 8A and 8B are image diagrams showing an example of change in the display on the HUD when the shift position is the reverse position;

FIGS. 11A and 11B are image diagrams showing an example of change in the display on the HUD when an automatic drive is started;

DETAILED DESCRIPTION OF EMBODIMENTS

Figure 1:
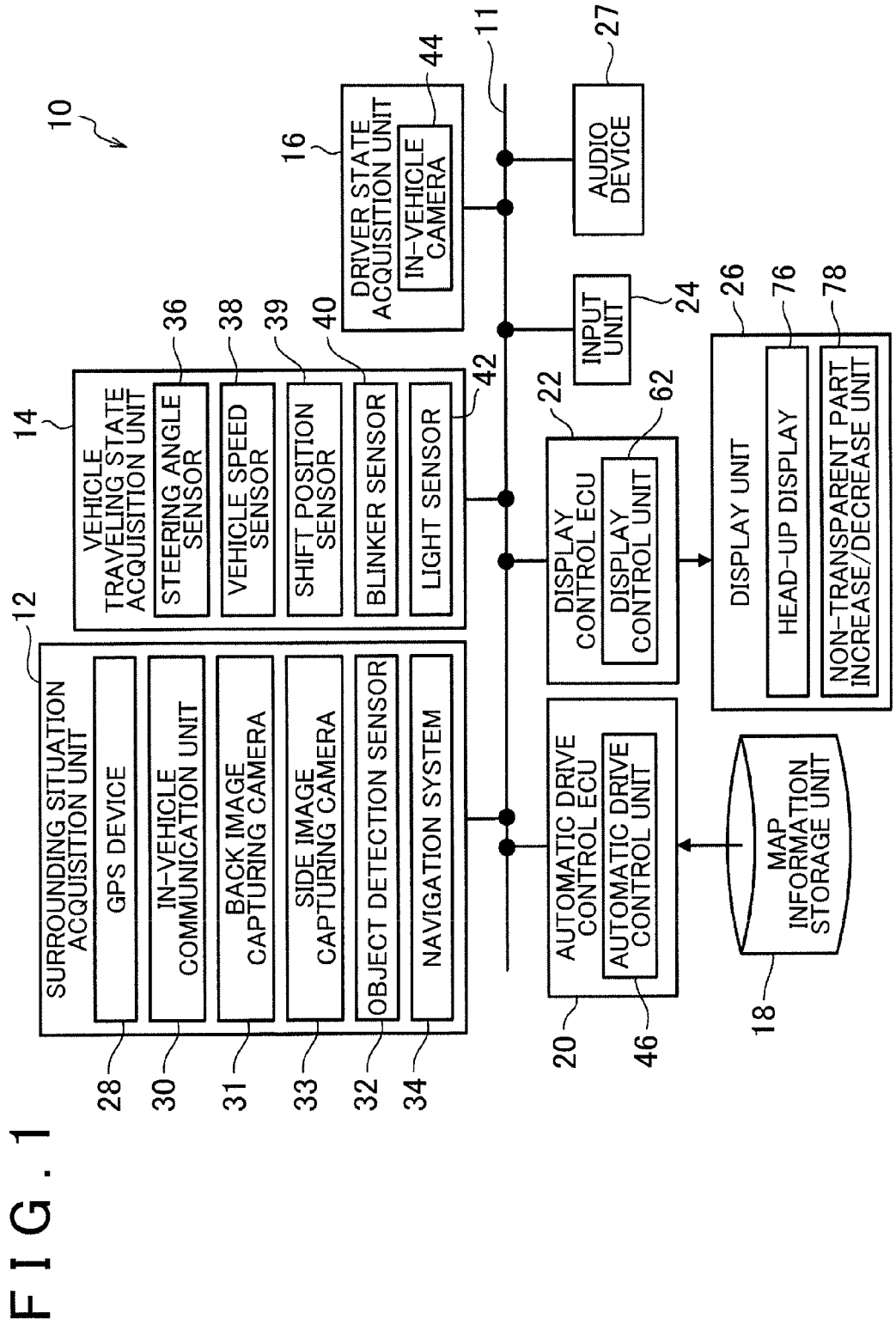
FIG. 1 is a block diagram showing a general configuration of an in-vehicle system in an embodiment.

An example of an embodiment of the present invention is described below in detail with reference to the drawings. FIG. 1 shows an in-vehicle system 10 mounted on a vehicle. This in-vehicle system 10 functions also as an in-vehicle display device according to the present invention. In FIG. 1, the figure of a part, included in the in-vehicle system 10 but not related to the present invention, is omitted.

The in-vehicle system 10 includes a surrounding situation acquisition unit 12, a vehicle traveling state acquisition unit 14, a driver state acquisition unit 16, a map information storage unit 18, an automatic drive control ECU 20, a display control ECU 22, an input unit 24, a display unit 26, and an audio device 27. The surrounding situation acquisition unit 12, vehicle traveling state acquisition unit 14, driver state acquisition unit 16, automatic drive control ECU 20, display control ECU 22, input unit 24, display unit 26, and audio device 27 are interconnected via a bus 11.

The surrounding situation acquisition unit 12 acquires information indicating the situation of the vehicle's surrounding environment. The surrounding situation acquisition unit 12 includes a GPS device 28, an in-vehicle communication unit 30, a back image capturing camera 31, a side image capturing camera 33, an object detection sensor 32, and a navigation system 34.

The Global Positioning System (GPS) device 28 receives GPS signals from a plurality of GPS satellites to measure the position of the vehicle. The more the number of GPS signals is, the higher the measuring accuracy of the GPS device 28 is. The in-vehicle communication unit 30 is a communication device that carries out at least one of the vehicle-vehicle communication with another vehicle and the road-vehicle communication with a roadside unit.

The back image capturing camera 31 captures the space in back of the vehicle as an image. The back image capturing camera 31 is an example of a first image capturing unit. The side image capturing camera 33 captures the space on a side of the vehicle as an image. The image capturing range of the side image capturing camera 33 includes a blind spot of the driver. The blind spot is a space around the vehicle, not directly observed by the driver. The side image capturing camera 33 is an example of a second image capturing unit.

The object detection sensor 32, which includes at least one of a millimeter wave radar and an ultrasonic sonar, detects the position and the movement speed of an object around the vehicle, such as a vehicle, pedestrian, store, and obstacle. The object detection range of the object detection sensor 32 includes a blind spot of the driver on a side of the vehicle. The object detection sensor 32 is an example of an object detection unit. The navigation system 34 displays the position of the vehicle on the map, or a suggested route to a traveling destination, based on the position information from the GPS device 28 and the map information.

The vehicle traveling state acquisition unit 14 acquires information indicating the traveling state and the operation state of the vehicle. The vehicle traveling state acquisition unit 14 includes a steering angle sensor 36, a vehicle speed sensor 38, a shift position sensor 39, a blinker sensor 40, and a light sensor 42. The steering angle sensor 36 is a sensor that detects the steering angle of the vehicle, and the vehicle speed sensor 38 is a sensor that detects the traveling speed of the vehicle. The shift position sensor 39 is a sensor that detects the shift position of the vehicle (for example, the gear positions of the transmission). The blinker sensor 40 is a sensor that detects the direction indicated by the direction indicator switch lever of the vehicle, and the light sensor 42 is a sensor that detects the on/off state of the light of the vehicle. In addition to the sensors described above, a sensor that detects at least one of the brake pedal depression amount and the wiper operation state may also be provided.

The driver state acquisition unit 16 acquires the information indicating the driver state. The driver state is a state indicating whether the driver is drowsy, inattentive, excited, or calm. The driver state acquisition unit 16, which includes an in-vehicle camera 44, senses bio-information, including at least one of driver's line of sight, face direction, movement of the eyes, and movement of the face, through image recognition and, based on the sensed bio-information, senses the driver state. In addition to the in-vehicle camera 44, a directional microphone that acquires sounds in the vehicle, a biosensor provided on the steering wheel, or a brain wave sensor may be used to sense the driver state.

Figure 2A:
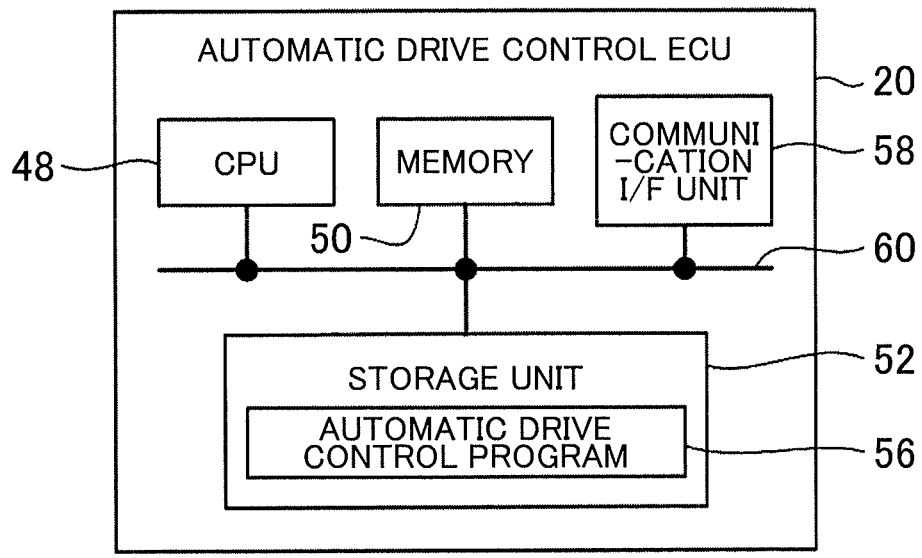
FIG. 2A is a block diagram showing a general configuration of an automatic drive control ECU.

The automatic drive control ECU 20 includes an automatic drive control unit 46 that performs the automatic drive control processing. As the drive assist processing that assists the driver in driving the vehicle, the automatic drive control processing enables the vehicle (host vehicle), on which the in-vehicle system 10 is mounted, to travel automatically without driver's driving operation. As shown in FIG. 2A, the automatic drive control ECU 20 includes a CPU 48, a memory 50, a nonvolatile storage unit 52 that stores an automatic drive control program 56, and a communication interface (I/F) unit 58 that carries out communication with the sensors and actuators. These components are interconnected via a bus 60. The automatic drive control ECU 20 works as the automatic drive control unit 46 when the automatic drive control program 56 is read from the storage unit 52 for expansion into the memory 50 and the automatic drive control program 56, expanded in the memory 50, is executed by the CPU 48.

To allow the vehicle to travel automatically, the automatic drive control unit 46 determines the situation of the vehicle and its surroundings based on the information obtained from the sensors and performs the automatic drive control processing that controls the accelerator amount, brake amount, and steering angle amount. In this embodiment, the automatic drive control processing performed by the automatic drive control unit 46 includes the processing for determining whether the state of the vehicle and its surroundings is in a situation in which a warning to the driver is required and, if so, for outputting the warning information indicating a warning to be issued to the driver. The situation in which a warning is required to the driver includes a case in which an emergency vehicle is approaching the vehicle, in which the entrance of the road the vehicle is going to enter is the exit of a one-way road, and in which the distance between the preceding vehicle traveling ahead and the vehicle becomes smaller than a predetermined distance. Because the automatic drive control processing by the automatic drive control unit 46 can be implemented by a known technology, its detailed description is omitted. The automatic drive control unit 46 is an example of a warning determination unit and a drive assist unit.

Figure 2B:
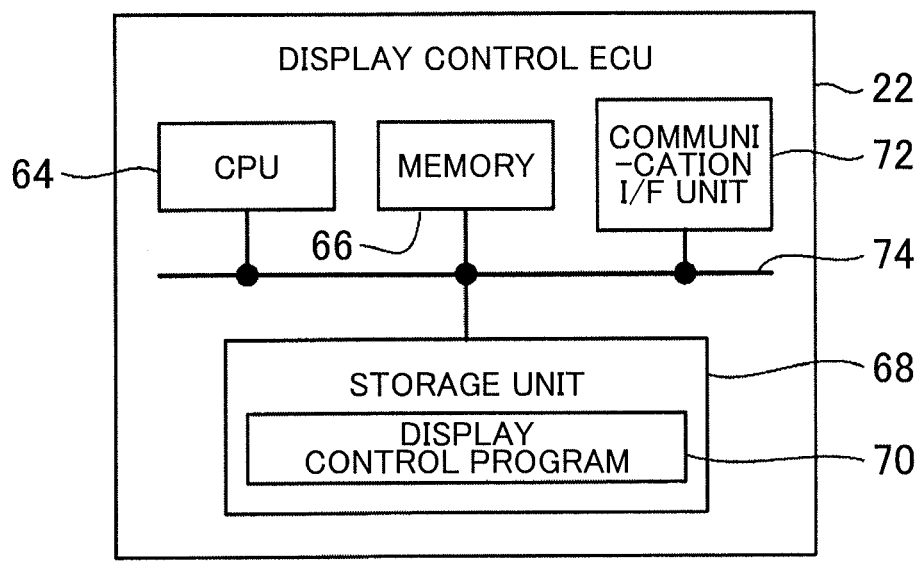
FIG. 2B is a block diagram showing a general configuration of a display control ECU.

On the other hand, as shown in FIG. 1, the display control ECU 22 includes a display control unit 62 that controls image display on a head-up display (hereinafter called a HUD 76) that will be described later. As shown in FIG. 2B, the display control ECU 22 includes a CPU 64, a memory 66, a nonvolatile storage unit 68 that stores a display control program 70, and a communication interface (I/F) unit 72 that carries out communication with an external device. These components are interconnected via a bus 74. The display control ECU 22 works as the display control unit 62 when the display control program 70 is read from the storage unit 68 for expansion into the memory 66 and the display control program 70, expanded in the memory 66, is executed by the CPU 64. The display control unit 62 is an example of a first display control unit to a third display control unit.

The input unit 24, used by the driver to enter information into the automatic drive control ECU 20, includes at least one of a button, a switch, and a touch screen. The driver enters an automatic drive start instruction and an automatic drive termination instruction into the automatic drive control ECU 20 via the input unit 24.

The display unit 26 includes the HUD 76, which presents information from the automatic drive control ECU 20 to the driver, and a non-transparent part increase/decrease unit 78. The HUD 76 includes a display panel 82 and a combiner 84 as shown in FIG. 3. The display panel 82, embedded in an instrument panel 80, emits a light flux spatially modulated according to a display image to be projected on the HUD 76. The combiner 84, formed of a material the light transmissivity of which is equal to or higher than a predetermined value, is installed between a windshield glass 79 of the vehicle and the instrument panel 80. On this combiner 84, a display image, represented by the light flux emitted from the display panel 82, is projected in the driver's visual field in front of the driver's seat.

The HUD 76 receives an instruction, which specifies an image to be displayed on the combiner 84, from the display control ECU 22 and controls the driving of the display panel 82 according to the specified image. Then, the light flux, emitted from the display panel 82, is focused on the combiner 84, and the image, specified by the display control ECU 22, is enlarged and projected on the combiner 84. This allows the driver to visually recognize the enlarged and projected image that is superimposed on the scene in the real space ahead of the vehicle. The configuration of the HUD 76 is not limited to the configuration shown in FIG. 3, but another known configuration may also be used.

Figure 4:
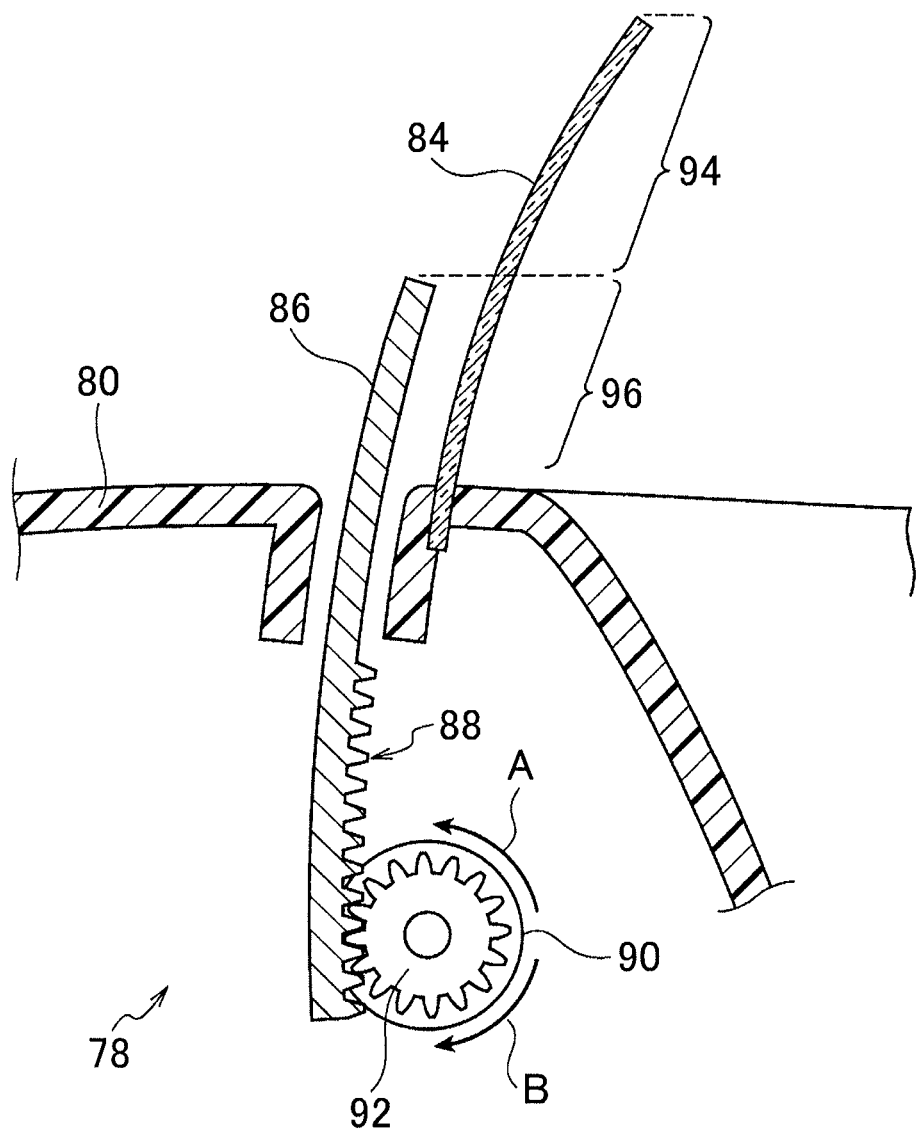
FIG. 4 is a cross section diagram showing an example of a non-transparent part increase/decrease unit.

On the other hand, the non-transparent part increase/decrease unit 78 has a non-transparent plate 86 that is made of a non-transparent material and has a flat, rectangular shape. The non-transparent plate 86, provided in roughly parallel with the combiner 84 at a predetermined interval, can move in the up-down direction of the vehicle while keeping roughly parallel to the combiner 84. As shown in FIG. 4, the combiner 84 has a shape slightly curved in the longitudinal direction of the vehicle and, in conformity with the combiner 84, the non-transparent plate 86 also has a shape slightly curved in the longitudinal direction of the vehicle. The non-transparent plate 86 has a rack 88 formed at one end of the transverse direction of the vehicle. The rack 88 is engaged with a pinion gear 92 mounted on the rotation axis of a motor 90. The non-transparent plate 86 moves downward when the pinion gear 92 is turned counterclockwise in FIG. 4 (in the direction indicated by arrow A in FIG. 4) by the motor 90, and moves upward when the pinion gear 92 is turned clockwise in FIG. 4 (in the direction indicated by arrow B in FIG. 4) by the motor 90.

The non-transparent plate 86 shields a part of a lower side of a light flux that is directed from the space ahead of the vehicle to the driver's eyes through the combiner 84 (a light flux directed from the space ahead of the vehicle toward the driver through the combiner 84). As the non-transparent plate 86 is moved in the up-down direction by the driving force of the motor 90, the light-flux shielding amount (cross-section area that is shielded) varies and, as this amount varies, the area of the display part corresponding to the non-transparent plate 86 (non-transparent display part 96) varies. The motor 90 of the non-transparent part increase/decrease unit 78 moves the non-transparent plate 86 to the lower position around the lower-limit position in the up-down movement of the non-transparent plate 86 or to the upper position around the upper-limit position in the up-down movement of the non-transparent plate 86.

A transparent display part 94 is a part of the whole display part and corresponds to the light flux directed from the space ahead of the vehicle to the driver's eyes through the combiner 84 without being shielded by the non-transparent plate 86. The non-transparent display part 96 is a part of the whole display part and corresponds to the non-transparent plate 86 (the light flux shielded by the non-transparent plate 86). The above whole display part corresponds to the whole surface of the combiner 84. When the non-transparent plate 86 is positioned at the lower position, the position of the boundary between the transparent display part 94 and the non-transparent display part 96 is approximately equal in height to the position of the boundary between the windshield glass 79 of the vehicle, as viewed by the driver, and the instrument panel 80 as shown in FIG. 5.

On the other hand, when the non-transparent plate 86 is positioned at the upper position, the area of the transparent display part 94 is decreased and the area of the non-transparent display part 96 is increased, as compared to the case in which the non-transparent plate 86 is positioned in the lower position, as shown in FIG. 6. In this case, the position of the boundary between the transparent display part 94 and the non-transparent display part 96 is higher than the position of the boundary between the windshield glass 79 of the vehicle, as viewed from the driver, and the instrument panel 80. Because the light flux from the space ahead of the vehicle is shielded in the non-transparent display part 96, the scene in the real space ahead of the vehicle is not visually recognized by the driver in the non-transparent display part 96 when viewed from the driver. Instead, only the image enlarged and projected in the non-transparent display part 96 of the combiner 84 is visually recognized.

The HUD 76 and the non-transparent part increase/decrease unit 78 are an example of a display unit. The low-transmissivity display part 96 is not limited to a non-transparent part. Any part may be used if the light transmissivity for the light from the real space ahead of the vehicle is lower than that of the transparent display part 94 (display part in which the effect of the brightness and the color tone of the scene in the real space ahead of the vehicle can be reduced).

Figure 7A:
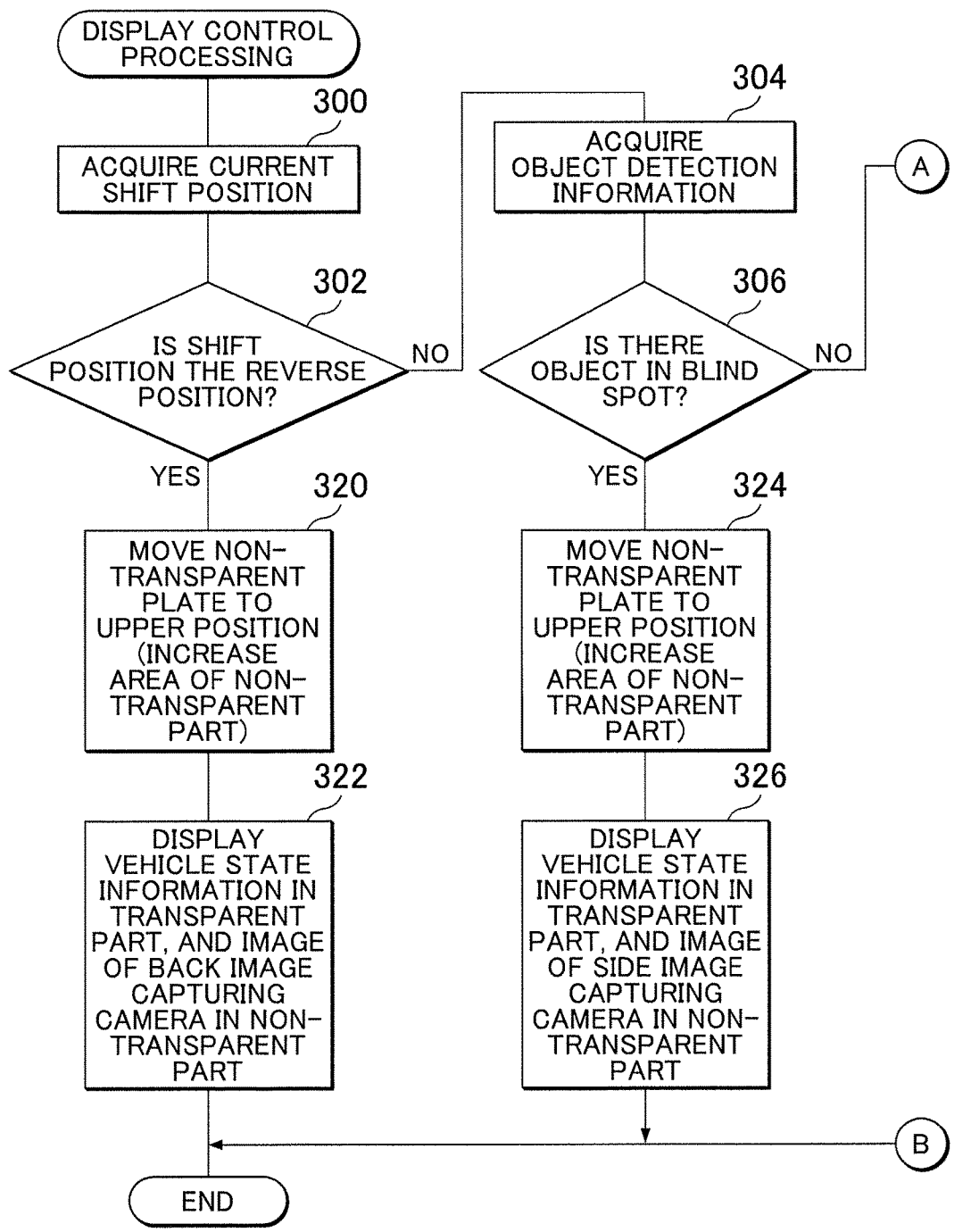
FIGS. 7A and 7B are flowcharts showing the contents of the display control processing.
Figure 7B:
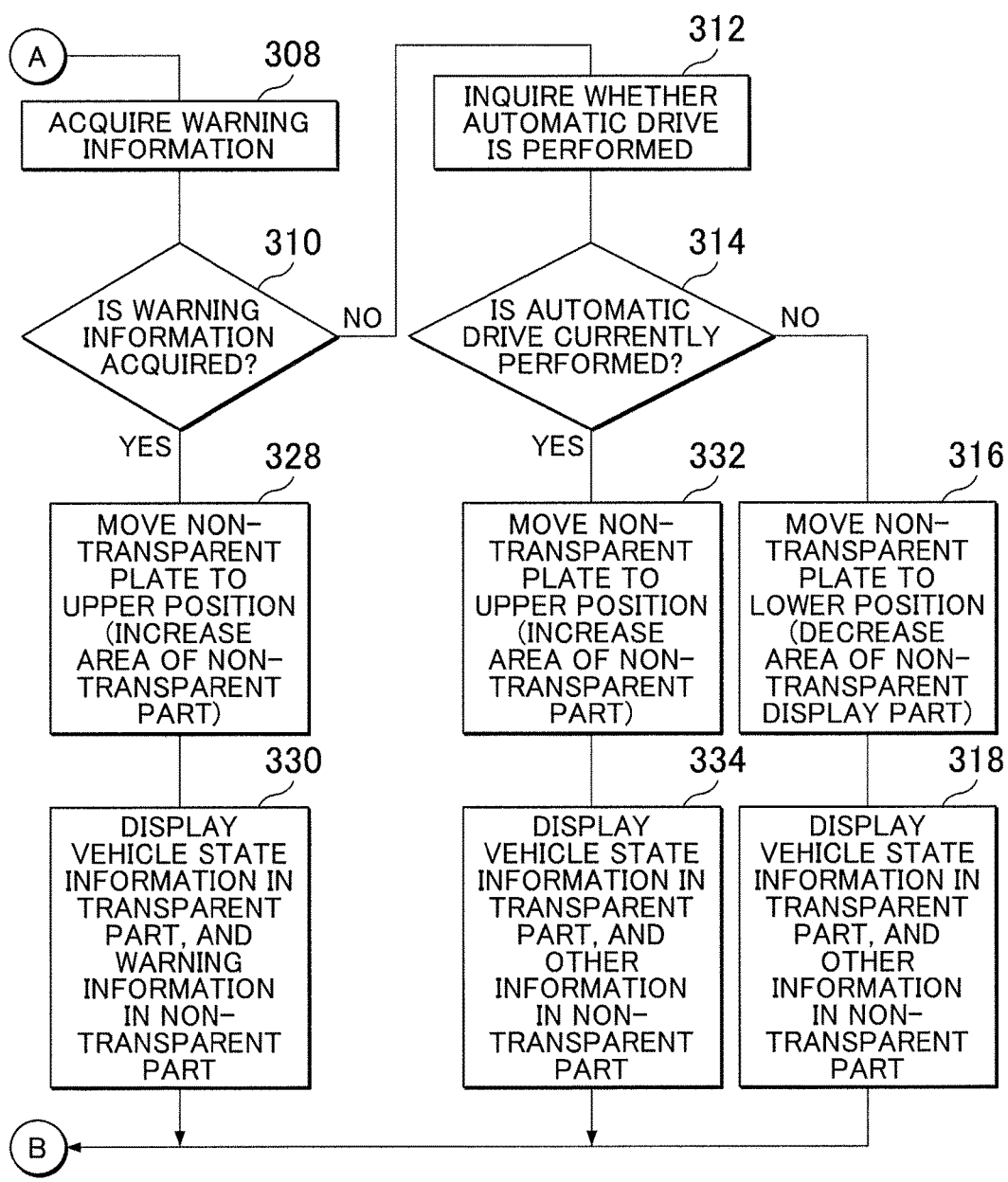

Next, the operation of this embodiment is described below with reference to the flowchart shown FIG. 7. In the operation of this embodiment, the display control processing is performed by the display control unit 62 (display control ECU 22) while the ignition switch of a vehicle, on which the in-vehicle system 10 is mounted, is on.

In step 300 of the display control processing, the display control unit 62 acquires the information, which indicates the current shift position of the vehicle, from the shift position sensor 39 of the vehicle traveling state acquisition unit 14. This information may be acquired via the automatic drive control ECU 20 rather than directly from the shift position sensor 39. In step 302 that follows, based on the information acquired in step 300, the display control unit 62 determines whether the current shift position of the vehicle is the reverse position.

If the determination in step 302 is negative, the processing proceeds to step 304. In step 304, the display control unit 62 acquires the object detection information, which indicates the detection result of the position and the movement speed of an object around the vehicle, from the object detection sensor 32 of the surrounding situation acquisition unit 12. This information may also be obtained via the automatic drive control ECU 20 rather than directly from the object detection sensor 32. In step 306 that follows, based on the object detection information acquired in step 304, the display control unit 62 determines whether there is an object in a blind spot of the driver on a side of the vehicle.

If the determination in step 306 is negative, the processing proceeds to step 308. In step 308, the display control unit 62 tries to acquire warning information from the automatic drive control ECU 20. In step 310 that follows, the display control unit 62 determines in step 308 whether warning information could be acquired from the automatic drive control ECU 20, that is, whether warning information was output from the automatic drive control ECU 20.

If the determination in step 310 is negative, the processing proceeds to step 312. In step 312, the display control unit 62 inquires of the automatic drive control ECU 20 whether the automatic drive control processing is performed by the automatic drive control unit 46. In step 314 that follows, based on the inquiry result obtained in step 312, the display control unit 62 determines whether the automatic drive control processing is currently performed for the vehicle.

In all determinations in steps 302, 306, 310, and 314 are negative, the processing proceeds to step 316. In step 316, the display control unit 62 controls the non-transparent part increase/decrease unit 78 to move the non-transparent plate 86 to the lower position (the position shown in FIG. 5) to increase the area of the transparent display part 94 and to decrease the area of the non-transparent display part 96 (to decrease the area ratio of the area of the non-transparent display part 96 to the area of the transparent display part 94). If the non-transparent plate 86 is already positioned at the lower position, step 316 is skipped.

In step 318 that follows, the display control unit 62 controls the driving of the display panel 82 of the HUD 76 such that the vehicle state information indicating the state of the vehicle is displayed in the transparent display part 94 and the other information is displayed in the non-transparent display part 96. That is, the display control unit 62 divides the display part of the display panel 82 into two parts with a division line that corresponds to the boundary between the current transparent display part 94 and the current non-transparent display part 96. Then, the display control unit 62 displays the image of information, which is to be displayed in the transparent display part 94, in the part corresponding to the transparent display part 94 that is one of the two parts, and the image of information, which is to be displayed in the non-transparent display part 96, in the part corresponding to the non-transparent display part 96. As a result, the image displayed in the transparent display part 94 is visually recognized by the driver such that the image is superimposed on the scene in the real space ahead of the vehicle. On the other hand, in the non-transparent display part 96, the scene in the real space ahead of the vehicle is not visually recognized, but only the image displayed in the non-transparent display part 96 is visually recognized by the driver.

Figure 9A:
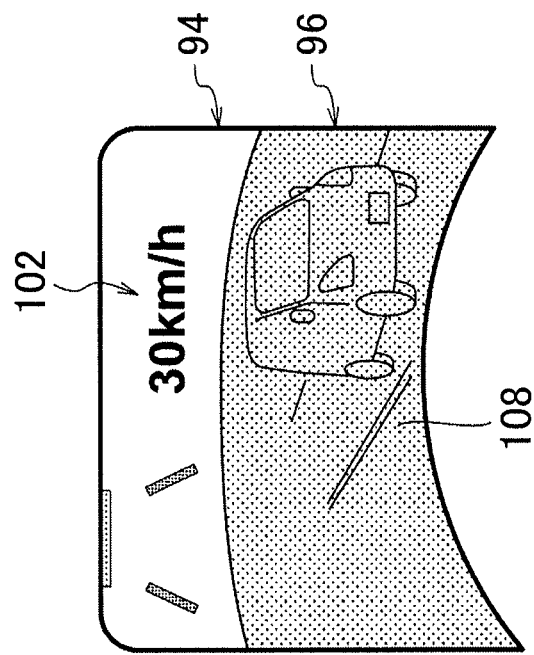
FIGS. 9A and 9B are image diagrams showing an example of change in the display on the HUD when an object appears in a blind spot.
Figures 10A, 10B:
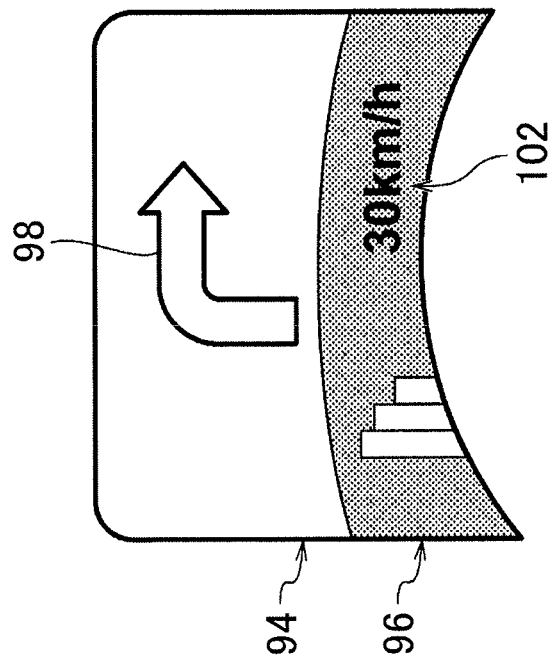
FIGS. 10A and 10B are image diagrams showing an example of change in the display on the HUD when warning information is output.

As an example of the vehicle state information displayed in the transparent display part 94, FIG. 5 and FIG. 10A show the state in which a direction indication mark 98 is displayed, and FIG. 8A, FIG. 9A, and FIG. 11A show the state in which a vehicle icon 100 and a vehicle speed display 102 are displayed. As an example of other information displayed in the non-transparent display part 96, FIG. 8A, FIG. 9A, and FIG. 11A show the state in which a music title display 104 being played back on the audio device 27 is displayed, and FIG. 10A shows the state in which the vehicle speed display 102 is displayed.

On the other hand, if vehicle's current shift position indicated by the information acquired in step 300 is the reverse position, the determination in step 302 is affirmative and the processing proceeds to step 320. In step 320, the display control unit 62 controls the non-transparent part increase/decrease unit 78 to move the non-transparent plate 86 to the upper position (the position indicated in FIG. 6) to decrease the area of the transparent display part 94 and to increase the area of the non-transparent display part 96 (to increase the area ratio of the area of the non-transparent display part 96 to the area of the transparent display part 94). If the non-transparent plate 86 is already positioned at the upper position, step 320 is skipped.

In step 322 that follows, the display control unit 62 controls the driving of the display panel 82 of the HUD 76 such that the vehicle state information, which indicates the state of the vehicle, is displayed in the transparent display part 94 the area of which is decreased (in the transparent display part 94 after the area has been decreased) and such that the image, which is captured by the back image capturing camera 31 and which indicates the situation in back of the vehicle, is displayed in the non-transparent display part 96 the area of which is increased (in the non-transparent display part 94 after the area has been increased). For example, FIG. 8B shows an example in which the vehicle speed display 102 is displayed in the transparent display part 94 the area of which is decreased and the rear image 106 indicating the situation in back of the vehicle is displayed in the non-transparent display part 96 the area of which is increased.

Thus, an image displayed in the transparent display part 94, such as the vehicle speed display 102, is visually recognized by the driver as an image superimposed on the scene in the real space ahead of the vehicle. On the other hand, because the scene in the real space ahead of the vehicle is not visually recognized in the non-transparent display part 96, a rear image 106, which indicates the situation of the space in back of the vehicle displayed in the non-transparent display part 96, is visually recognized by the driver with high visibility without being affected by the brightness and the color tone of the scene in the real space ahead of the vehicle.

If the vehicle's shift position is the reverse position, the driver has a need to know the situation in back of the vehicle. In such a case, the area of the non-transparent display part 96 is increased and, in the non-transparent display part 96 the area of which is increased, the rear image 106 indicating the situation in back of the vehicle is displayed with high visibility. This allows the driver, who references the displayed rear image 106, to know the situation in back of the vehicle, thus increasing safety.

If it is determined, based on the object detection information acquired in step 304, that there is an object is a blind spot on a side of the vehicle, the determination in step 306 is affirmative and the processing proceeds to step 324. In step 324, the display control unit 62 controls the non-transparent part increase/decrease unit 78 to move the non-transparent plate 86 to the upper position (the position indicated in FIG. 6) to decrease the area of the transparent display part 94 and to increase the area of the non-transparent display part 96. If the non-transparent plate 86 is already positioned at the upper position, step 324 is skipped.

Figure 9B:
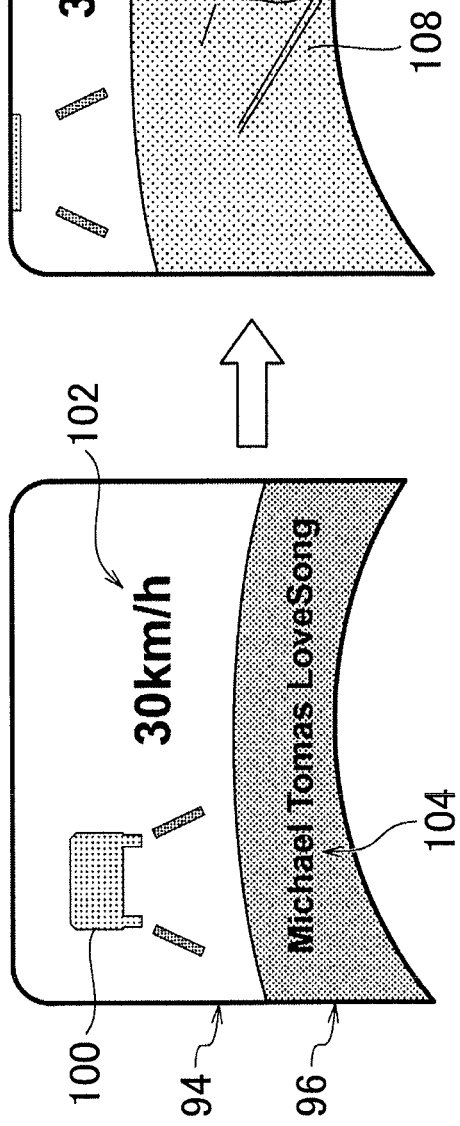

In step 326 that follows, the display control unit 62 controls the driving of the display panel 82 of the HUD 76 such that the vehicle state information, which indicates the state of the vehicle, is displayed in the transparent display part 94 the area of which is decreased and such that the image, which is captured by the side image capturing camera 33 and which indicates the situation on side of the vehicle including the blind spot of the driver, is displayed in the non-transparent display part 96 the area of which is increased. For example, FIG. 9B shows an example in which the vehicle speed display 102 is displayed in the transparent display part 94 the area of which is decreased and a side image 108 indicating the situation on side of the vehicle is displayed in the non-transparent display part 96 the area of which is increased.

Thus, an image displayed in the transparent display part 94, such as the vehicle speed display 102, is visually recognized by the driver as an image superimposed on the scene in the real space ahead of the vehicle. On the other hand, because the scene in the real space ahead of the vehicle is not visually recognized in the non-transparent display part 96, the side image 108, which indicates the situation on side of the vehicle displayed in the non-transparent display part 96, is visually recognized by the driver with high visibility without being affected by the brightness and the color tone of the scene in the real space ahead of the vehicle.

If there is an object in the blind spot of the driver, the driver is required to recognize the object in the blind spot and to pay attention to the object. In such a case, the area of the non-transparent display part 96 is increased and, in the non-transparent display part 96 the area of which is increased, the side image 108, which indicates the situation on the side of the vehicle that includes the blind spot of the driver, is displayed with high visibility. This allows the driver, who references the displayed side image 108, to recognize the object in the blind spot on the side of the vehicle and to pay attention to that object, thus increasing safety.

If the warning information can be acquired from the automatic drive control ECU 20 in step 308, the determination in step 310 is affirmative and the processing proceeds to step 328. In step 328, the display control unit 62 controls the non-transparent part increase/decrease unit 78 to move the non-transparent plate 86 to the upper position (the position indicated in FIG. 6) to decrease the area of the transparent display part 94 and to increase the area of the non-transparent display part 96. If the non-transparent plate 86 is already positioned at the upper position, step 328 is skipped.

In step 330 that follows, the display control unit 62 controls the driving of the display panel 82 of the HUD 76 such that the vehicle state information, which indicates the state of the vehicle, is displayed in the transparent display part 94 the area of which is decreased and such that the image of the warning to the driver, which indicates the warning information acquired from the automatic drive control ECU 20, is displayed in the non-transparent display part 96 the area of which is increased. For example, FIG. 10B shows an example in which the direction indication mark 98 is displayed in the transparent display part 94 the area of which is decreased and a warning image 110, which indicates an abnormal exhaust-gas temperature and an engine malfunction (for example, an image in which the brightness of the characters of "Warning" is periodically switched between high brightness and low brightness), is displayed in the non-transparent display part 96 the area of which is increased.

Thus, an image displayed in the transparent display part 94, such as the direction indication mark 98, is visually recognized by the driver as an image superimposed on the scene in the real space ahead of the vehicle. On the other hand, because the scene in the real space ahead of the vehicle is not visually recognized in the non-transparent display part 96, the warning image 110 displayed in the non-transparent display part 96 is visually recognized by the driver with high visibility without being affected by the brightness and the color tone of the scene in the real space ahead of the vehicle.

If the warning image 110 described above is displayed in the transparent display part 94, its visibility may be decreased due to the effect of the brightness and the color tone of the scene in the real space ahead of the vehicle. A decrease in the visibility of the warning image 110 may lead to a situation in which the warning is not recognized by the driver or is wrongly recognized by the driver as a low-warning-level warning. In contrast, if warning information is output from the automatic drive control ECU 20, the area of the non-transparent display part 96 is increased in this embodiment and, in the non-transparent display part 96 the area of which is increased, the warning image 110 indicating warning information is displayed with high visibility. The warning image 110 displayed in this manner allows the driver to recognize the warning, thus increasing safety.

If the result indicating that the automatic drive control processing is being performed is received from the automatic drive control unit 46 in response to the inquiry issued in step 312, the determination in step 314 is affirmative and the processing proceeds to step 332. In step 332, the display control unit 62 controls the non-transparent part increase/decrease unit 78 to move the non-transparent plate 86 to the upper position (the position indicated in FIG. 6) to decrease the area of the transparent display part 94 and to increase the area of the non-transparent display part 96. If the non-transparent plate 86 is already positioned at the upper position, step 332 is skipped.

In step 334 that follows, the display control unit 62 controls the driving of the display panel 82 of the HUD 76 such that the vehicle state information, which indicates the state of the vehicle, is displayed in the transparent display part 94 the area of which is decreased and such that the image, which indicates the information other than the information about the state of the vehicle, such as car navigation information or announcement/entertainment related information received from the audio device, is displayed in the non-transparent display part 96 the area of which is increased. For example, FIG. 11B shows an example in which the vehicle speed display 102 is displayed in the transparent display part 94 the area of which is decreased and a spectrum analyzer image 112 of the music played back on the audio device 27 is displayed in the non-transparent display part 96 the area of which is increased.

Thus, an image displayed in the transparent display part 94, such as the vehicle speed display 102, is visually recognized by the driver as an image superimposed on the scene in the real space ahead of the vehicle. On the other hand, because the scene in the real space ahead of the vehicle is not visually recognized in the non-transparent display part 96, the spectrum analyzer image 112, which is displayed in the non-transparent display part 96, is visually recognized by the driver with high visibility without being affected by the brightness and the color tone of the scene in the real space ahead of the vehicle.

While the automatic drive control processing is performed by the automatic drive control unit 46, it is assumed that the load on the driver is reduced and that the amount of information to be transmitted to the driver, which indicates the state of the vehicle is reduced. Accordingly, if the automatic drive control processing is performed by the automatic drive control unit 46, the area of the non-transparent display part 96 is increased and, in the non-transparent display part 96 the area of which is increased, the image of announcement/entertainment related information such as the spectrum analyzer image 112 is displayed with high visibility. This allows the image of information/entertainment related information to be displayed with high visibility without compromising safety.

The configuration of the non-transparent part increase/decrease unit 78 is not limited to the configuration shown in FIG. 4. Other configurations of the non-transparent part increase/decrease unit 78 are described below with reference to FIG. 12 to FIG. 15.

Figure 12:
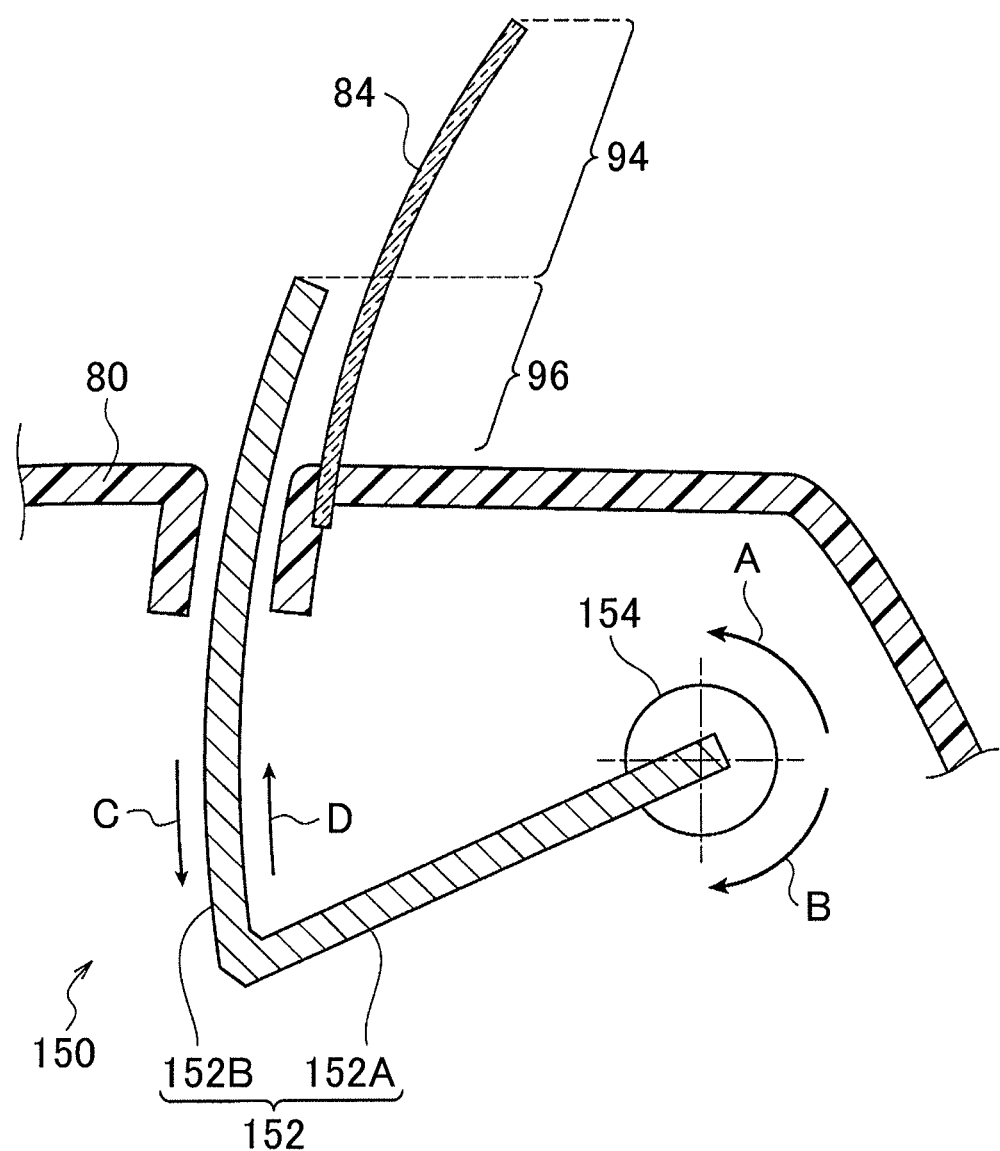
FIG. 12 is a cross section diagram showing another example of the non-transparent part increase/decrease unit.

A non-transparent part increase/decrease unit 150 shown in FIG. 12 has a non-transparent member 152 that is made of a non-transparent material and has a flat, rectangular shape. The non-transparent member 152 is bent at the intermediate portion in the short side direction to form a base part 152A and an arc part 152B. In conformity with the combiner 84, the arc part 152B of the non-transparent member 152 is slightly curved in the longitudinal direction of the vehicle, and the non-transparent member 152 is arranged such that the arc part 152B is roughly parallel with the combiner 84. The base part 152A of the non-transparent member 152 has the end, on the side opposite to the arc part 152B, mounted on the rotation axis of a motor 154.

Therefore, the non-transparent member 152 can move rotationally about the rotation axis of the motor 154. When the rotation axis of the motor 154 rotates counterclockwise in FIG. 12 (in the direction indicated by arrow A in FIG. 12), the non-transparent member 152 moves rotationally in the direction in which the arc part 152B lowers (in the direction indicated by arrow C in FIG. 12). When the rotation axis of the motor 154 rotates clockwise in FIG. 12 (in the direction indicated by arrow B in FIG. 12), the non-transparent member 152 moves rotationally in the direction in which the arc part 152B rises (in the direction indicated by arrow D in FIG. 12).

The arc part 152B of the non-transparent member 152 shields a part of a lower side of a light flux that is directed from the space ahead of the vehicle to the driver's eyes through the combiner 84. As the arc part 152B is moved in the up-down direction by the driving force of the motor 154, the shielding amount of a light flux varies and, as this amount varies, the area of the non-transparent display part 96 corresponding to the arc part 152B of the non-transparent member 152 varies. The non-transparent part increase/decrease unit 150 controls the rotation direction and the rotation amount of the rotation axis of the motor 154 to change the area ratio between the transparent display part 94 and the non-transparent display part 96.

Figure 13:
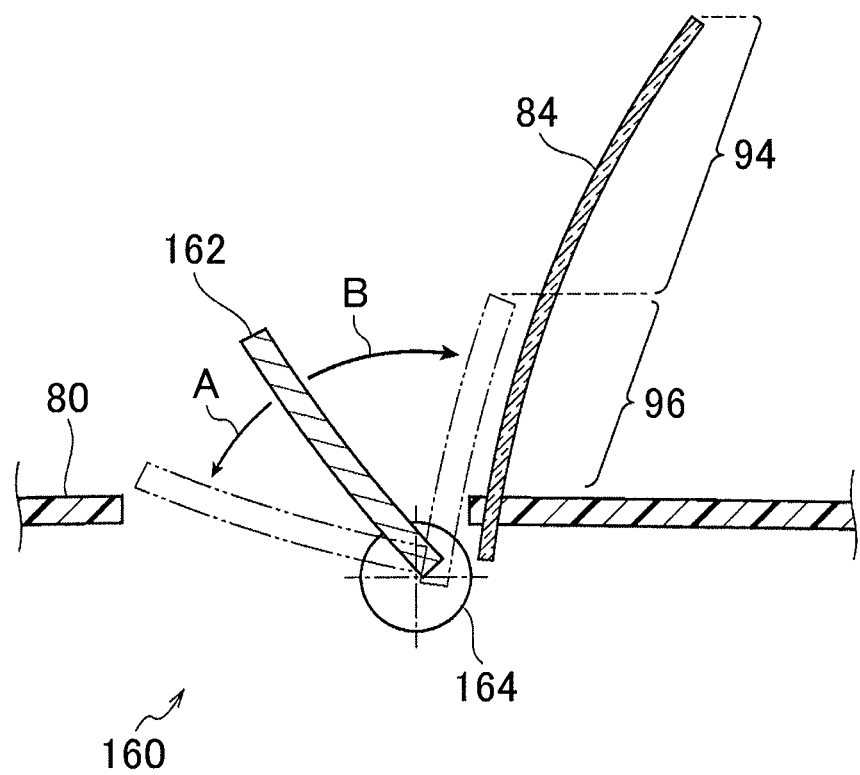
FIG. 13 is a cross section diagram showing another example of the non-transparent part increase/decrease unit.
Figure 14:
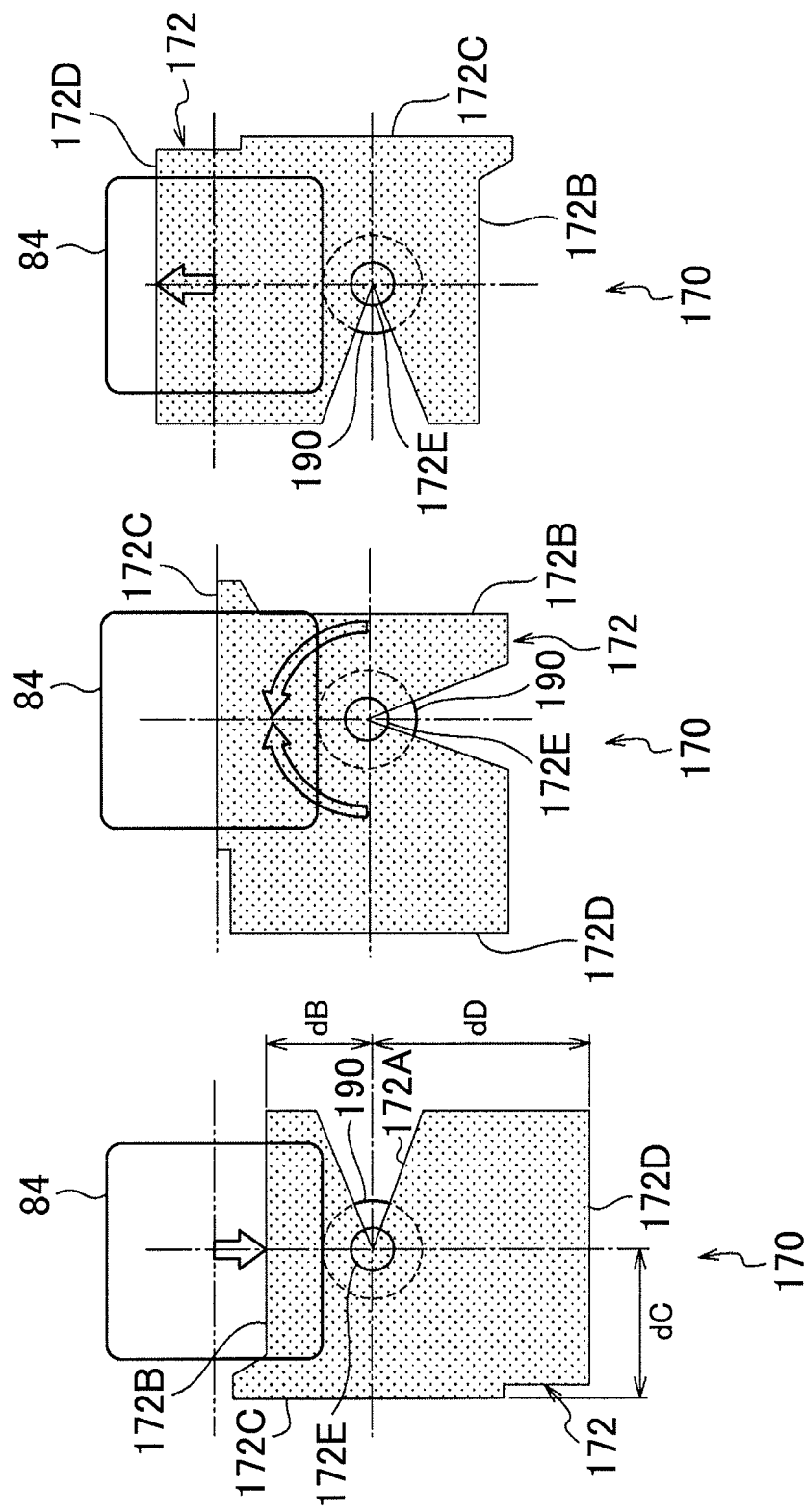
FIGS. 14A to 14C are cross section diagrams showing another example of the non-transparent part increase/decrease unit.

A non-transparent part increase/decrease unit 160 shown in FIG. 13 has a non-transparent plate 162 that is made of a non-transparent material and has a flat, rectangular shape. The non-transparent plate 162 has one of long sides mounted on the rotation axis of a motor 164. Therefore, the non-transparent plate 162 can move rotationally about the rotation axis of the motor 164. As the non-transparent plate 162 moves rotationally, the shielding amount (area of the non-transparent display part 96) of a light flux that is directed from the space ahead of the vehicle to the driver's eyes through the combiner 84 varies.

That is, when the rotation axis of the motor 164 rotates counterclockwise in FIG. 13 (in the direction indicated by arrow A in FIG. 13), the amount of protrusion (shielding amount of a light flux) of the non-transparent plate 162 into the optical path of a light flux, directed from the space ahead of the vehicle to the driver's eyes through the combiner 84, is decreased. As this amount is decreased, the area of the non-transparent display part 96 is decreased. Conversely, when the rotation axis of the motor 164 rotates clockwise in FIG. 13 (in the direction indicated by arrow B in FIG. 13), the amount of protrusion (shielding amount of a light flux) of the non-transparent plate 162 into the optical path of a light flux, directed from the space ahead of the vehicle to the driver's eyes through the combiner 84 is increased. As this amount is increased, the area of the non-transparent display part 96 is increased. In this manner, the non-transparent part increase/decrease unit 160 controls the rotation direction and the rotation amount of the rotation axis of the motor 164 to change the area ratio between the transparent display part 94 and the non-transparent display part 96.

A non-transparent part increase/decrease unit 170 shown in FIGS. 14A to 14C has a non-transparent plate 172 that is made of a non-transparent material and has a flat, almost-rectangular shape. This non-transparent plate 172 has a cutout 172A. The non-transparent plate 172 has a rotation center 172E at a position the distances of which to the three sides 172B to 172D, other than the side on which the cutout 172A is provided, are different from each other (dB≠dC≠dD: see FIG. 14A). The non-transparent plate 172 is mounted with this rotation center 172E on the rotation axis of a motor 190. Therefore, as the non-transparent plate 172 is rotated by the driving force of the motor 190, the shielding amount (area of the non-transparent display part 96) of a light flux, directed from the space ahead of the vehicle to the driver's eyes through the combiner 84, varies accordingly.

That is, when the non-transparent plate 172 is positioned at the position indicated in FIG. 14A, the amount of its protrusion (shielding amount of a light flux) into the optical path of a light flux, directed from the space ahead of the vehicle to the driver's eyes through the combiner 84, is minimized and, as this amount is minimized, the area of the non-transparent display part 96 is also minimized. When the non-transparent plate 172 is positioned at the position indicated in FIG. 14B, the amount of its protrusion (shielding amount of a light flux) into the optical path of a light flux, directed from the space ahead of the vehicle to the driver's eyes through the combiner 84, is intermediate and, as this amount is intermediate, the area of the non-transparent display part 96 is also intermediate. When the non-transparent plate 172 is positioned at the position indicated in FIG. 14C, the amount of its protrusion (shielding amount of a light flux) into the optical path of a light flux, directed from the space ahead of the vehicle to the driver's eyes through the combiner 84, is maximized and, as this amount is maximized, the area of the non-transparent display part 96 is also maximized. In this manner, the non-transparent part increase/decrease unit 170 controls the rotation direction and the rotation amount of the rotation axis of the motor to change the area ratio between the transparent display part 94 and the non-transparent display part 96.

Figure 15:
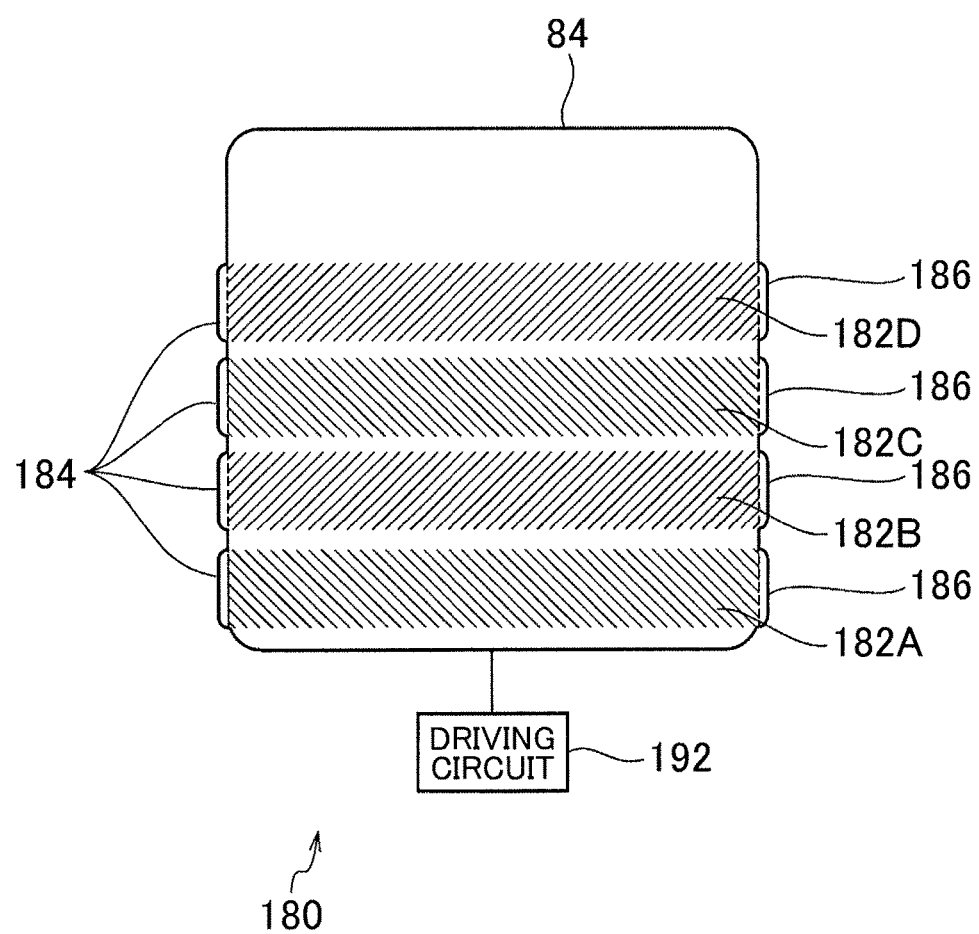
FIG. 15 is a plan view showing another example of the non-transparent part increase/decrease unit.

A non-transparent part increase/decrease unit 180 shown in FIG. 15 has a plurality of transmissivity changing parts 182A to 182D each of which is rectangular with the transverse direction of the combiner 84 as the longitudinal direction. The transmissivity changing parts 182A to 182D, arranged along the up-down direction of the combiner 84, change the light transmissivity by turning on or off the application of voltage to electrodes 184 and 186 provided on both sides in the transverse direction of the combiner 84. The non-transparent part increase/decrease unit 180 has a driving circuit 192 that independently controls turning on or off the application of voltage to the transmissivity changing parts 182A to 182D.

To increase the area of the non-transparent display part 96, the non-transparent part increase/decrease unit 180 decreases the light transmissivity of a predetermined number of transmissivity changing parts 182, sequentially in order of the vehicle's up-down direction beginning with the transmissivity changing part 182A positioned at the lower position, so that the number of transmissivity changing parts 182 for decreasing the light transmissivity will be increased. This decreases the area of the transparent display part 94 and increases the area of the non-transparent display part 96. To decrease the area of the non-transparent display part 96, the non-transparent part increase/decrease unit 180 increases the light transmissivity of a predetermined number of transmissivity changing parts 182, sequentially in order of the vehicle's up-down direction beginning with the transmissivity changing part 182D positioned at the upper position, so that the number of transmissivity changing parts 182 for decreasing the light transmissivity will be decreased. This increases the area of the transparent display part 94 and decreases the area of the non-transparent display part 96.

Although stored (installed) in advance in the storage unit 68 in the above description, the display control program 70 in this embodiment may also be provided as a form stored in a storage medium such as a CD-ROM or a DVD-ROM.

Although the automatic drive control ECU 20 that performs the automatic drive control processing and the display control ECU 22 that controls the display of an image on the HUD 76 are provided separately, the present invention is not limited to this configuration. Another configuration is also possible in which one ECU performs each of the automatic drive control processing and the display control processing.

What is claimed is:

1. An in-vehicle display device comprising:
a display unit that includes a transparent display part and a low-transmissivity display part, and that changes an area ratio of an area of the low-transmissivity display part to an area of the transparent display part, the transparent display part being a part through which a light from a real space ahead of a vehicle transmits and in which an image is superimposed on a scene in the real space, the low-transmissivity display part being a part a light transmissivity of which for a light from the real space is lower than a light transmissivity of the transparent display part and in which an image is displayed;
an image capturing unit that captures a space around the vehicle as an image; and
a first display control unit configured to control the display unit such that the area ratio is increased when a predetermined condition is satisfied as compared to when the predetermined condition is not satisfied, and the image captured by the image capturing unit is displayed in the low-transmissivity display part after the area ratio has been increased.

2. The in-vehicle display device according to claim 1, wherein:
the image capturing unit includes a first image capturing unit that captures a space in back of the vehicle as an image; and
the first display control unit is configured to control the display unit such that the area ratio is increased when a shift position of the vehicle is a reverse position as compared to when the shift position is not the reverse position, and the image captured by the first image capturing unit is displayed in the low-transmissivity display part after the area ratio has been increased.

3. The in-vehicle display device according to claim 1, further comprising an object detection unit that detects an object in a blind spot of a driver, on a side of the vehicle, wherein:
the image capturing unit includes a second image capturing unit that captures a space on the side of the vehicle, which includes the blind spot, as an image; and
the first display control unit is configured to control the display unit such that the area ratio is increased when an object in the blind spot is detected by the object detection unit as compared to when an object in the blind spot is not detected, and the image captured by the second image capturing unit is displayed in the low-transmissivity display part after the area ratio has been increased.

4. The in-vehicle display device according to claim 1, wherein:
the display unit includes a combiner, provided between a windshield glass and an instrument panel of the vehicle, and a low-transmissivity part increase/decrease unit that changes the area ratio; and
a display part of the combiner is divided into the transparent display part and the low-transmissivity display part.

5. The in-vehicle display device according to claim 4, wherein:
the low-transmissivity part increase/decrease unit includes a low-transparency member that shields or reduces a part of a lower side of a light flux, directed from the real space toward the driver through the combiner, and an actuator that moves the low-transparency member with respect to the combiner;
the transparent display part corresponds to a part of the light flux not shielded or reduced by the low-transparency member, and the low-transmissivity display part corresponds to the part of the light flux shielded or reduced by the low-transparency member; and
the area ratio is changed when the low-transparency member is moved with respect to the combiner.

6. The in-vehicle display device according to claim 5, wherein:
the actuator moves the low-transparency member with respect to the combiner along an up-down direction of the combiner; and
the area ratio is changed when the low-transparency member is moved along the up-down direction.

7. The in-vehicle display device according to claim 5, wherein:
the actuator rotates the low-transparency member with respect to the combiner about an axis along a transverse direction of the vehicle or an axis along a longitudinal direction of the vehicle; and
the area ratio is changed when the low-transparency member is rotated.

8. The in-vehicle display device according to claim 4, wherein:

the low-transmissivity part increase/decrease unit includes a plurality of transmissivity changing parts provided along an up-down direction of the combiner, and a driving circuit;
a light transmissivity of each of the plurality of transmissivity changing parts is changed by turning on or off an application of voltage, and the driving circuit controls turning on or off the application of voltage to the plurality of transmissivity changing parts; and
the area ratio is changed when the number of the transmissivity changing parts the light transmissivity of which is decreased is changed by the driving circuit.

9. An in-vehicle display device comprising:
a display unit that includes a transparent display part and a low-transmissivity display part, and that changes an area ratio of an area of the low-transmissivity display part to an area of the transparent display part, the transparent display part being a part through which a light from a real space ahead of a vehicle transmits and in which an image is superimposed on a scene in the real space, the low-transmissivity display part being a part a light transmissivity of which for a light from the real space is lower than a light transmissivity of the transparent display part and in which an image is displayed;
a warning determination unit configured to determine whether a warning is to be issued to a driver; and
a second display control unit configured to control the display unit such that the area ratio is increased when the warning determination unit determines that a warning is to be issued to the driver as compared to when the warning determination unit does not determine that a warning is to be issued to the driver, and information indicating the warning to be issued to the driver is displayed as an image in the low-transmissivity display part after the area ratio has been increased.

10. The in-vehicle display device according to claim 9, wherein:
the display unit includes a combiner, provided between a windshield glass and an instrument panel of the vehicle, and a low-transmissivity part increase/decrease unit that changes the area ratio; and
a display part of the combiner is divided into the transparent display part and the low-transmissivity display part.

11. The in-vehicle display device according to claim 10, wherein:
the low-transmissivity part increase/decrease unit includes a low-transparency member that shields or reduces a part of a lower side of a light flux, directed from the real space toward the driver through the combiner, and an actuator that moves the low-transparency member with respect to the combiner;
the transparent display part corresponds to a part of the light flux not shielded or reduced by the low-transparency member, and the low-transmissivity display part corresponds to the part of the light flux shielded or reduced by the low-transparency member; and
the area ratio is changed when the low-transparency member is moved with respect to the combiner.

12. The in-vehicle display device according to claim 11, wherein:
the actuator moves the low-transparency member with respect to the combiner along an up-down direction of the combiner; and
the area ratio is changed when the low-transparency member is moved along the up-down direction.

13. The in-vehicle display device according to claim 11, wherein:
the actuator rotates the low-transparency member with respect to the combiner about an axis along a transverse direction of the vehicle or an axis along a longitudinal direction of the vehicle; and
the area ratio is changed when the low-transparency member is rotated.

14. The in-vehicle display device according to claim 10, wherein:
the low-transmissivity part increase/decrease unit includes a plurality of transmissivity changing parts provided along an up-down direction of the combiner, and a driving circuit;
a light transmissivity of each of the plurality of transmissivity changing parts is changed by turning on or off an application of voltage, and the driving circuit controls turning on or off the application of voltage to the plurality of transmissivity changing parts; and
the area ratio is changed when the number of the transmissivity changing parts the light transmissivity of which is decreased is changed by the driving circuit.

15. An in-vehicle display device comprising:
a display unit that includes a transparent display part and a low-transmissivity display part, and that changes an area ratio of an area of the low-transmissivity display part to an area of the transparent display part, the transparent display part being a part through which a light from a real space ahead of a vehicle transmits and in which an image is superimposed on a scene in the real space, the low-transmissivity display part being a part a light transmissivity of which for a light from the real space is lower than a light transmissivity of the transparent display part and in which an image is displayed;
a drive assist unit configured to perform drive assist processing that assists a driver in driving the vehicle; and
a third display control unit configured to control the display unit such that the area ratio is increased when the drive assist unit performs the drive assist processing as compared to when the drive assist unit does not perform the drive assist processing, and information other than information indicating a state of the vehicle is displayed as an image in the low-transmissivity display part after the area ratio has been increased.

16. The in-vehicle display device according to claim 15, wherein:
the display unit includes a combiner, provided between a windshield glass and an instrument panel of the vehicle, and a low-transmissivity part increase/decrease unit that changes the area ratio; and
a display part of the combiner is divided into the transparent display part and the low-transmissivity display part.

17. The in-vehicle display device according to claim 16, wherein:
the low-transmissivity part increase/decrease unit includes a low-transparency member that shields or reduces a part of a lower side of a light flux, directed from the real space toward the driver through the combiner, and an actuator that moves the low-transparency member with respect to the combiner;
the transparent display part corresponds to a part of the light flux not shielded or reduced by the low-transparency member, and the low-transmissivity display part corresponds to the part of the light flux shielded or reduced by the low-transparency member; and the area ratio is changed when the low-transparency member is moved with respect to the combiner.

18. The in-vehicle display device according to claim 17, wherein:

the actuator moves the low-transparency member with respect to the combiner along an up-down direction of the combiner; and the area ratio is changed when the low-transparency member is moved along the up-down direction.

19. The in-vehicle display device according to claim 17, wherein:

the actuator rotates the low-transparency member with respect to the combiner about an axis along a transverse direction of the vehicle or an axis along a longitudinal direction of the vehicle; and the area ratio is changed when the low-transparency member is rotated.

20. The in-vehicle display device according to claim 16, wherein:

the low-transmissivity part increase/decrease unit includes a plurality of transmissivity changing parts provided along an up-down direction of the combiner, and a driving circuit;

a light transmissivity of each of the plurality of transmissivity changing parts is changed by turning on or off an application of voltage, and the driving circuit controls turning on or off the application of voltage to the plurality of transmissivity changing parts; and the area ratio is changed when the number of the transmissivity changing parts the light transmissivity of which is decreased is changed by the driving circuit.

* * * * *